(12) United States Patent
Lee et al.

(10) Patent No.: US 10,340,524 B2
(45) Date of Patent: Jul. 2, 2019

(54) NEGATIVE ELECTRODE FOR LITHIUM BATTERY AND LITHIUM BATTERY COMPRISING THE SAME

(71) Applicant: Samsung Electronics Co., Ltd., Suwon-si, Gyeonggi-do (KR)

(72) Inventors: Yonggun Lee, Incheon (KR); Toshinori Sugimoto, Hwaseong-si (KR); Yooseong Yang, Yongin-si (KR); Wonseok Chang, Seoul (KR); Hongsoo Choi, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 373 days.

(21) Appl. No.: 14/875,951

(22) Filed: Oct. 6, 2015

(65) Prior Publication Data

US 2016/0329567 A1 Nov. 10, 2016

(30) Foreign Application Priority Data

May 6, 2015 (KR) .......................... 10-2015-0063223

(51) Int. Cl.
   *H01M 10/52* (2006.01)
   *H01M 4/62* (2006.01)
   *H01M 10/052* (2010.01)
   *H01M 4/38* (2006.01)
   *H01M 4/134* (2010.01)
   (Continued)

(52) U.S. Cl.
   CPC .......... *H01M 4/628* (2013.01); *H01M 4/134* (2013.01); *H01M 4/366* (2013.01); *H01M 4/382* (2013.01); *H01M 4/405* (2013.01); *H01M 10/052* (2013.01); *H01M 10/0569* (2013.01); *H01M 2004/027* (2013.01); *H01M 2300/0028* (2013.01); *Y02T 10/7011* (2013.01)

(58) Field of Classification Search
   CPC .......... H01M 10/052; H01M 10/0569; H01M 2004/027; H01M 2300/0028; H01M 4/134; H01M 4/366; H01M 4/382; H01M 4/405; H01M 4/628; H01M 10/52; Y02T 10/7011
   See application file for complete search history.

(56) References Cited

U.S. PATENT DOCUMENTS 6,277,514 B1 * 8/2001 Ying ...................... H01M 2/16
                                                         429/129
6,444,369 B1   9/2002 Kamino et al.
(Continued)

FOREIGN PATENT DOCUMENTS

JP   2013235789 A   11/2013
KR   10-2005-0038905 A   4/2005
(Continued)

*Primary Examiner* — Jacob B Marks
(74) *Attorney, Agent, or Firm* — Cantor Colburn LLP

(57) ABSTRACT

A negative electrode for a lithium battery, including a lithium metal; and a protective layer disposed on at least a part of the lithium metal, wherein the protective layer includes a block copolymer including a structural domain and a hard domain covalently linked to the structural domain, wherein the structural domain includes a structural block of the block copolymer, wherein the hard domain includes a hard block of the block polymer, wherein the structural block includes a plurality of structural repeating units, and wherein the hard block includes a plurality of olefin repeating units.

22 Claims, 8 Drawing Sheets

(51) Int. Cl.
*H01M 4/36* (2006.01)
*H01M 4/40* (2006.01)
*H01M 10/0569* (2010.01)
*H01M 4/02* (2006.01)

(56) References Cited

U.S. PATENT DOCUMENTS

| | | |
|---|---|---|
| 7,026,071 B2 | 4/2006 | Mayes et al. |
| 7,745,048 B2 | 6/2010 | Hwang et al. |
| 2002/0048706 A1* | 4/2002 | Mayes .................. C01B 13/14 429/231.1 |
| 2005/0274000 A1* | 12/2005 | Oh ...................... H01M 4/5815 29/623.3 |
| 2007/0099089 A1* | 5/2007 | Miura .................... C08G 65/14 429/307 |
| 2009/0104523 A1 | 4/2009 | Mullin et al. |
| 2011/0033755 A1* | 2/2011 | Eitouni ................ H01M 4/134 429/310 |
| 2011/0200892 A1* | 8/2011 | Nakanishi ............... H01M 4/88 429/403 |
| 2012/0189910 A1* | 7/2012 | Brune ................. C08G 81/025 429/189 |
| 2013/0095392 A1* | 4/2013 | Shin ..................... H01G 9/2013 429/338 |
| 2016/0294005 A1 | 10/2016 | Lee et al. |

FOREIGN PATENT DOCUMENTS

| | | |
|---|---|---|
| KR | 1020140112597 A | 9/2014 |
| WO | 2013168544 A1 | 11/2013 |

* cited by examiner

NEGATIVE ELECTRODE FOR LITHIUM BATTERY AND LITHIUM BATTERY COMPRISING THE SAME

CROSS-REFERENCE TO RELATED APPLICATION

This application claims priority to and the benefit of Korean Patent Application No. 10-2015-0063223, filed on May 6, 2015, in the Korean Intellectual Property Office, the content of which is incorporated herein in its entirety by reference.

BACKGROUND

1. Field

The present disclosure relates to a negative electrode for lithium batteries, and a lithium battery including the negative electrode.

2. Description of the Related Art

Lithium secondary batteries are high-performance batteries having the highest energy density among other currently available secondary batteries, and which are applicable in various fields such as electric vehicles.

A lithium battery may use a lithium thin film as an anode. When a lithium thin metal is used as the anode, it may react with liquid electrolyte during charging or discharging due to the high reactivity of lithium, or it may lead to a growth of dendritic formations on the lithium thin film anode. Accordingly, a lithium battery including such a lithium metal thin film may have reduced lifetime and stability. Therefore, there is a need for an improved lithium electrode.

SUMMARY

Provided is a negative electrode for a lithium battery that has a protective layer having good mechanical characteristics.

Provided is a lithium battery with improved cell performance that includes the negative electrolyte.

Additional aspects will be set forth in part in the description which follows and, in part, will be apparent from the description, or may be learned by practice of the presented exemplary embodiments.

According to an aspect of an exemplary embodiment, a negative electrode for a lithium battery includes:
a lithium metal; and
a protective layer disposed on at least a part of the lithium metal, wherein the protective layer includes a block copolymer including a structural domain and a hard domain covalently linked to the structural domain,
wherein the structural domain includes a structural block of the block copolymer,
wherein the hard domain includes a hard block of the block polymer,
wherein the structural block includes a plurality of structural repeating units, and
wherein the hard block includes a plurality of olefin repeating units.

According to an aspect of another exemplary embodiment, a lithium battery includes:
a positive electrode,
the above-described negative electrode, and
an electrolyte disposed between the positive electrode and the negative electrode.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
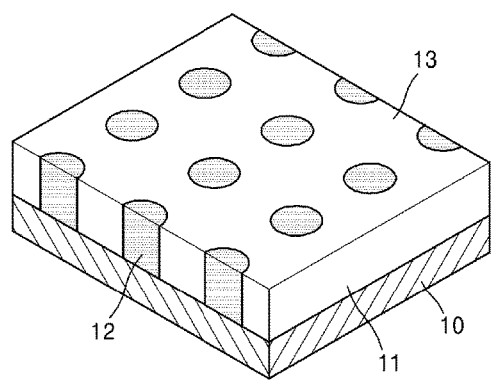
FIG. 1 is a schematic view illustrating a structure of a negative electrode for a lithium battery, according to an exemplary embodiment.

Reference will now be made in detail to exemplary embodiments of a negative electrode for lithium batteries and a lithium battery including the negative electrode, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present disclosure. As used herein, the term "and/or includes any and all combinations of one or more of the associated listed items. Expressions such as at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or features relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

According to an aspect of the present disclosure, a negative electrode for a lithium battery, includes:

a lithium metal; and a protective layer disposed on at least a part of the lithium metal, wherein the protective layer includes a block copolymer including a structural domain and a hard domain covalently linked to the structural domain, wherein the structural domain includes a structural block of the block copolymer, wherein the hard domain includes a hard block of the block polymer, wherein the structural block includes a plurality of structural repeating units, and wherein the hard block includes a plurality of olefin repeating units.

A mixed weight ratio of the structural block and the hard block may be in a range of about 1:1 to about 1:9, and in some embodiments, about 1:1 to about 1:4. While not wishing to be bound by a theory, it is understood that when the mixed weight ratio is within these ranges, the protective layer may have good mechanical characteristics without reduction in ductility and tensile modulus characteristics, and may effectively suppress growth of lithium dendrite.

As used herein, the term "hard domain" refers to a region that contributes to the improved mechanical strength of the block copolymer, has hydrophobic and crystalline characteristics, and may also be impregnated with liquid electrolyte to enable the protective layer to have the characteristics of separator.

In some embodiments, the structural domain of the block copolymer may have a cylindrical phase. When the structural domain has a cylindrical phase, the mixed weight ratio of the structural domain to the hard domain may be within the above-described ranges. When the structural domain has a cylindrical phase, the hard domain may be impregnated with a larger amount of liquid electrolyte, compared to when the structural domain has a lamellar structure, thus to maintain the current and ion distribution on a surface of the lithium metal uniform, suppress growth of dendrite, improve conduction characteristics of the liquid electrolyte and interfacial characteristics between the lithium metal electrode and the liquid electrolyte, and consequentially improve ionic conductivity of the protective layer.

The block copolymer has a number average molecular weight of about 10,000 Daltons to about 200,000 Daltons.

The protective layer may further include a lithium salt. The amount of the lithium salt may be in a range of about 10 parts to about 70 parts by weight, and in some embodiments, about 20 to about 50 parts by weight, based on 100 parts by weight of the block copolymer. When the amount of the lithium salt is within these ranges, the protective layer may have further improved ionic conductivity.

For example, the lithium salt may be at least one selected from $LiSCN$, $LiN(CN)_2$, $LiClO_4$, $LiBF_4$, $LiAsF_6$, $LiPF_6$, $LiCF_3SO_3$, $LiC(CF_3SO_2)_3$, $LiN(SO_2C_2F_5)_2$, $LiN(SO_2CF_3)_2$, $LiN(SO_2F)_2$, $LiSbF_6$, $LiPF_3(CF_2CF_3)_3$, $LiPF_3(CF_3)_3$, and $LiB(C_2O_4)_2$.

The protective layer may have an elongation at about 25° C. of about 500% or greater, and in some embodiments, about 1,000% to about 1,500%. While not wishing to be bound by a theory, it is understood that when the protective layer has an elongation within these ranges, the protective layer may have good ductility to suppress the growth of dendrite on the surface of the lithium metal, and efficiently suppress a volumetric change of the negative electrode.

In some embodiments, the protective layer may further include a liquid electrolyte, which allows the hard domain of the protective layer to form an ion-conducting path along the liquid electrolyte.

The liquid electrolyte may further include at least one selected from an organic solvent, an ionic liquid, and a lithium salt. Non-limiting examples of the organic solvent are a carbonate compound, a glyme compound, a dioxolane compound, dimethyl ether, and 1,1,2,2-tetrafluoroethyl 2,2,3,3-tetrafluoropropyl ether. For example, the organic solvent may be at least one selected from ethylene carbonate, propylene carbonate, dimethyl carbonate, diethyl carbonate, ethylmethyl carbonate, fluoroethylene carbonate, gamma-butyrolactone, dimethoxy ethane, diethoxy ethane, dimethylene glycol dimethyl ether, triethylene glycol dimethyl ether, tetraethylene glycol dimethyl ether, polyethylene glycol dimethyl ether, succinonitrile, sulfolane, dimethyl sulfone, ethyl methyl sulfone, diethyl sulfone, adiponitrile, and 1,1,2,2-tetrafluoroethyl-2,2,3,3-tetrafluoropropyl ether.

In some embodiments, when the protective layer is used together with a liquid electrolyte containing a carbonate compound as the organic solvent, the protective layer may be stable against the organic solvent such as a carbonate compound or against the electrolyte containing such an organic solvent, and have good chemical resistance.

A lithium metal has a high electric capacity per unit of weight, and thus may be used to implement a high-capacity battery. However, dendritic growth on the lithium metal electrode during intercalation/deintercalation of lithium ions may cause a short between positive and negative electrodes. The lithium metal is highly reactive and may cause a side reaction with an electrolyte. Thus, it may reduce cycle lifetime of the battery. To address this drawback, a protective layer for protecting the surface of the lithium metal may be used.

In general, a conventional protective layer uses a gel polymer membrane including a polymer and a liquid electrolyte. However, the polymer of the gel polymer membrane may have unsatisfactory mechanical characteristics, or insufficient ductility and tensile modulus characteristics even with strong intensity, and thus may not satisfactorily suppress the growth of lithium dendrite.

When a gel polymer membrane is prepared using a polymer having insufficient mechanical characteristics, inorganic nanoparticles may be further added. However, when inorganic nanoparticles are added to prepare a gel polymer membrane, the gel polymer membrane may have increased interfacial resistance, despite the improved mechanical characteristics. When a protective layer for the lithium metal includes a block copolymer including a polyethylene oxide domain, the protective layer may be dissolved in an electrolyte containing a carbonate compound as an organic solvent.

Unlike such conventional protective layers, in some embodiments of the present disclosure, the protective layer may include a block copolymer including a structural domain and a hard domain that provides an ion-conducting path, and thus have ensured intensity, ductility, and tensile modulus characteristics, improved interfacial characteristics between the lithium metal electrode and the protective layer, and stability against an organic solvent or liquid electrolyte. The hard domain may also be stably impregnated with a liquid electrolyte and thus have improved ionic conductivity. Ensured uniform interfacial ion distribution between the lithium metal electrode and the protective layer may effectively suppress the formation of dendrite. Microphase separation between the structural domain and the hard domain may also be facilitated so that a nanostructure may be easily formed at low costs. A lithium battery with improved cycle characteristics may also be manufactured using the protective layer.

In some embodiments, the block polymer for the protective layer may be synthesized on a bulk scale, for example, by atom transfer radical polymerization (ATRP) and/or reversible addition fragmentation chain transfer polymerization (RAFT), and the production cost of the block polymer may also be low.

The block copolymer may have improved crystalline characteristics and improved thermal stability due to the inclusion of the olefin repeating units of the hard domain. The thermal stability of the block copolymer may be identified by differential scanning calorimetry. The block copolymer may have a glass transition temperature of about 150° C. to about 300° C.

The amount of the hard block including the olefin repeating units may be in a range of about 50 parts to about 80 parts by weight, for example, about 70 parts to about 78 parts by weight, based on 100 parts by weight of the block copolymer. While not wishing to be bound by a theory, it is understood that when the amount of the hard block including the olefin repeating units is within these ranges, the protective layer with improved ductility and tensile modulus characteristics may be obtained.

The hard block with the olefin repeating units may be at least one selected from polyethylene, polybutylene, polyisobutylene, polypropylene, a combination thereof, and a copolymer thereof.

The structural block including the structural repeating units of the block copolymer may be responsible for the mechanical characteristics of the block copolymer. For example, the structural repeating units may be derived from, but not limited to, at least one monomer selected from styrene, 4-bromostyrene, tert-butylstyrene, divinylbenzene, methyl methacrylate, isobutyl methacrylate, polyethylene, polypropylene, dimethylsiloxane, polyisobutylene, N-isopropylacrylamide, vinylidene fluoride, acrylonitrile, 4-methylpentene-1, polybutylene terephthalate, polyethylene terephthalate, and vinylpyridine.

The structural block including the structural repeating units may be at least one selected from polystyrene, hydrogenated polystyrene, polymethacrylate, poly(methyl methacrylate), polyvinylpyridine, polyvinyl cyclohexane, polyimide, polyamide, polyethylene, polybutylene, polypropylene, poly(4-methylpentene-1), poly(polybutylene terephthalate), poly(isobutyl methacrylate), poly(polyethylene terephthalate), polydimethylsiloxane, polyacrylonitrile, polyvinyl cyclohexane, polymaleic acid, poly(maleic anhydride), polyamide, poly(methacrylic acid), poly(tert-butyl vinyl ether), poly(cyclohexyl methacrylate), poly(cyclohexyl vinyl ether), poly(tert-butyl vinyl ether), polyvinylidenefluoride, and polydivinylbenzene, or may include a copolymer comprising at least two of these polymers.

In some embodiments, the structural domain may include the structural block including a plurality of structural repeating units. The structural block may have a weight average molecular weight of about 10,000 Daltons or greater, and in some embodiments, about 10,000 Daltons to about 500,000 Daltons, and in some other embodiments, about 15,000 Daltons to about 400,000 Daltons. The amount of the structural block that forms the structural domain may be in a range of about 20 parts to about 50 parts by weight, and in some embodiments, about 22 parts to about 30 parts by weight, based on 100 parts by weight of a total weight of the block copolymer. While not wishing to be bound by a theory, it is understood that when the amount of the structural block is within these ranges, the protective layer) may have improved mechanical characteristics, including strength.

In some embodiments, the hard domain may include a hard block including a plurality of olefin repeating units. The polymer block including a plurality of olefin repeating units may have a weight average molecular weight of about 10,000 Daltons or greater, and in some embodiments, about 10,000 Daltons to about 500,000 Daltons, and in some other embodiments, about 15,000 Daltons to about 400,000 Daltons. When the amount of the hard block of the hard domain is within these ranges, the protective layer may have improved ductility, tensile modulus, and strength characteristics.

The block copolymer may include a linear block copolymer, a branched block copolymer, or a combination thereof. The block copolymer may have any shape, for example, a lamellar, cylindrical, spherical, ellipsoidal, polyhedral, or gyroid shape, or the like. In an embodiment, the block copolymer may have an irregular shape. The branched block copolymer may be any type of copolymer known to one of ordinary skill in the art. For example, the branched block copolymer can be a stereoblock copolymer, a graft polymer, a star-shaped polymer, a comb polymer, a brush polymer, or a polymer network, without being limited thereto, and any polymer commonly used in the art as the branched block copolymer may also be used.

In some embodiments, the block copolymer in the protective layer may be at least one selected from a diblock copolymer (A-B) and a triblock copolymer (A-B-A' or B-A-B'). The blocks A and A' may be the same or different and may be structural polymer units, each independently including at least one selected from polystyrene (PS), polydivinylbenzene, polymethylmethacrylate (PMMA), polyvinylpyridine, polyimide, polyethylene, polypropylene, polyvinylidene fluoride, polyacrylonitrile, and polydimethylsiloxane, a combination thereof, and a copolymer thereof. The blocks B and B' may be the same or different and may each independently be at least one selected from, for example, polyethylene, polybutylene, polypropylene, a combination thereof, and a copolymer thereof.

The block copolymer may also include a linear tetrablock copolymer A-B-A'-B'. In the tetrablock copolymer, the blocks A and A' may be the same or different and may be ion conductive polymer blocks and the blocks B and B' may be the same or different and may be non-conducting polymer blocks. Ion conductive blocks A, A' and non-conducting blocks B and B' may be selected from the same polymer blocks as described above with regard to the triblock copolymer A-B-A'.

In some embodiments, the block copolymer may be
a block copolymer including a polystyrene first block and a polyethylene second block;
a block copolymer including a polystyrene first block and a polybutylene second block;
a block copolymer including a polymethylmethacrylate block and a polyethylene second block;
a block copolymer including a polymethylmethacrylate block and a polybutylene second block;
a block copolymer including a polymethylmethacrylate first block and a polyethylene/polybutylene second block;
a block copolymer including a polystyrene first block, a polyethylene second block, and a polystyrene third block;
a block copolymer including a polystyrene first block, a polybutylene second block, and a polystyrene third block;
a block copolymer including a polymethylmethacrylate first block, a polyethylene second block, and a polystyrene third block;
a block copolymer including a polymethylmethacrylate first block, a polybutylene second block, and a polystyrene third block;
a block copolymer including a polymethylmethacrylate first block, a polyethylene/polybutylene second block, and a polystyrene third block;
a block copolymer including a polystyrene first block and a polyethylene/polybutylene second block copolymer; or
a block copolymer including a polystyrene first block, a polyethylene/polybutylene second block, and a polystyrene third block.

In some embodiments, when the block copolymer of the protective layer is a block copolymer including a first block, a second block, and a third block, a total amount of the first block and the third block may be in a range of about 20 parts to about 35 parts by weight, and in some embodiments, about 22 parts to about 30 parts by weight, based on 100 parts by weight of a total weight of the block copolymer, and the amount of the second block may be in a range of about 65 parts to about 80 parts by weight, and in some embodiments, about 70 parts to about 78 parts by weight, based on 100 parts by weight of the block copolymer.

FIG. 1 is a schematic view illustrating a structure of a negative electrode for a lithium battery, according to an exemplary embodiment, including a lithium metal electrode 10 and a protective layer 11.

Referring to FIG. 1, the protective layer 11 that includes a block copolymer including a polystyrene (PS) block that forms a structural domain 12, and a polyethylene/polybutylene block that forms a hard domain 13 is disposed on a surface of the lithium metal electrode 10.

The protective layer 11 may further include at least one selected from an inorganic particle, an ionic liquid, a polymer ionic liquid, and an oligomer. The inorganic particle may include at least one selected from a metal hydroxide, a metal carbonate, a metal carboxylate, a metal silicate, a metal aluminosilicate, a metal carbide, a metal nitride, a metal halide, a metal nitrate, a carbon oxide, a carbonaceous material, and an organic-inorganic composite. For example, the inorganic particle may be at least one selected from $SiO_2$, $TiO_2$, $ZnO$, $Al_2O_3$, $BaTiO_3$, graphite oxide, graphene oxide, cage-structured silsesquioxane, $Li_2CO_3$, $Li_3PO_4$, $Li_3N$, $Li_3S_4$, $Li_2O$, montmorillonite, and a metal-organic framework (MOF). When the protective layer 11 further includes such inorganic particles, the protective layer 11 may have improved mechanical characteristics. The inorganic particle may have an average particle diameter of about 1 μm or less, and in some embodiment, about 500 nm or less, and in some other embodiments, about 100 nm or less. For example, the inorganic particle may have an average particle diameter of about 1 nm to about 100 nm, and in some embodiments, about 5 nm to about 100 nm, and in some embodiments, about 10 nm to about 100 nm, and in some other embodiments, about 10 nm to about 70 nm, and in still other embodiments, about 30 nm to about 70 nm. While not wishing to be bound by a theory, it is understood that when the average particle diameter of the inorganic particle is within these ranges, it may be possible to form a protective layer having improved film formability and improved mechanical properties without deterioration in ionic conductivity.

The inorganic particle may be at least one selected from $SiO_2$, cage-structured silsesquioxane, $TiO_2$, $ZnO$, $Al_2O_3$, $BaTiO_3$, and a metal-organic framework (MOF).

For example, the cage-structured silsesquioxane may be a polyhedral oligomeric silsesquioxane (POSS). The number of silicon atoms in the POSS may be about 8 or less, for example, 6 or 8. For example, the cage-structured silsesquioxane may be a compound represented by Formula 1.

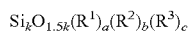

Formula 1

In Formula 1, $R^1$, $R^2$, and $R^3$ may be each independently a hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbocyclic group, or a silicon-containing functional group. In Formula 1, k=a+b+c, and 6≤k≤20.

For example, the cage-structured silsesquioxane may be a compound represented by Formula 2 or a compound represented by Formula 3.

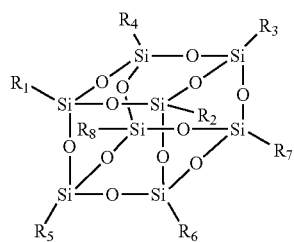

Formula 2

In Formula 2, $R_1$ to $R_8$ may be each independently a hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbocyclic group, or a silicon-containing functional group.

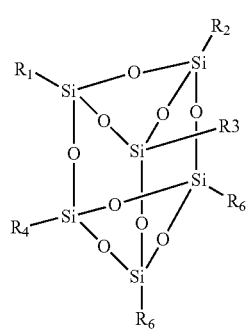

Formula 3

In Formula 3, $R_1$ to $R_6$ may be each independently a hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbocyclic group, or a silicon-containing functional group.

In some embodiments, in the compound of Formula 2 or 3 as a cage-structured silsesquioxane, $R_1$ to $R_8$ may be isobutyl groups. For example, the cage-structured silsesquioxane may be heptaisobutyl-t8-silsesquioxane.

The amount of the inorganic particle may be in a range of about 1 part to about 40 parts by weight, and in some embodiments, about 5 parts to about 20 parts by weight, based on 100 parts by weight of the block copolymer including the structural domain and the hard domain. While not wishing to be bound by a theory, it is understood that when the amount of the inorganic particle is within these ranges, an protective layer with improved mechanical characteristics and improved ionic conductivity may be manufactured.

The metal-organic framework (MOF) may be a porous crystalline compound in which a Group 12 to Group 15 metal ion or a Group 12 to Group 15 metal ionic cluster is chemically bonded with an organic ligand.

The organic ligand refers to an organic group that may form an organic bond such as coordinate bond, ionic bond, or covalent bond. For example, an organic group having at least two binding sites for such metal ions as described above may form a stable structure through binding with the metal ions.

The Group 2 to Group 5 metal ion may be at least one selected from cobalt (Co), nickel (Ni), molybdenum (Mo), tungsten (W), ruthenium (Ru), osmium (Os), cadmium (Cd), beryllium (Be), calcium (Ca), barium (Ba), strontium (Sr), iron (Fe), manganese (Mn), chromium (Cr), vanadium (V), aluminum (Al), titanium (Ti), zirconium (Zr), copper (Cu), zinc (Zn), magnesium (Mg), hafnium (Hf), niobium (Nb), tantalum (Ta), rhenium (Re), rhodium (Rh), iridium (Ir), palladium (Pd), platinum (Pt), silver (Ag), scandium (Sc), yttrium (Y), indium (In), thallium (Tl), silicon (Si), germanium (Ge), tin (Sn), lead (Pb), arsenic (As), antimony (Sb), and bismuth (Bi). The organic ligand may be a group derived from at least one of compounds selected from an aromatic dicarboxylic acid, an aromatic tricarboxylic acid, an imidazole compound, a tetrazole, a 1,2,3-triazole, a 1,2,4-triazole, a pyrazole, an aromatic sulfonic acid, an aromatic phosphoric acid, an aromatic sulfinic acid, an aromatic phosphinic acid, a bipyridine, and compounds having at least one functional group selected from an amino group, an imino group, an amide group, a methane dithio acid group ($—CS_2H$), a methane dithio acid anion group ($—CS_2^-$), a pyridine group, and a pyrazine group.

Non-limiting examples of the aromatic dicarboxylic acid and the aromatic tricarboxylic acid are benzene dicarboxylic acid, benzene tricarboxylic acid, biphenyl dicarboxylic acid, and triphenyl dicarboxylic acid.

For example, the organic ligand may be a group originating from compounds represented by any structure of the following Formula 4.

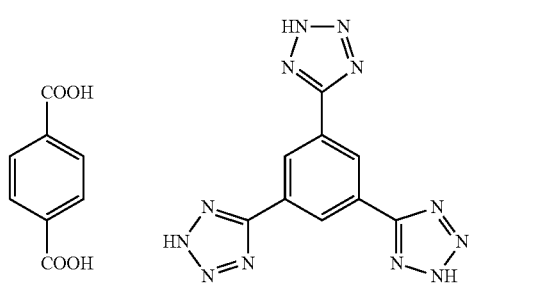

Formula 4

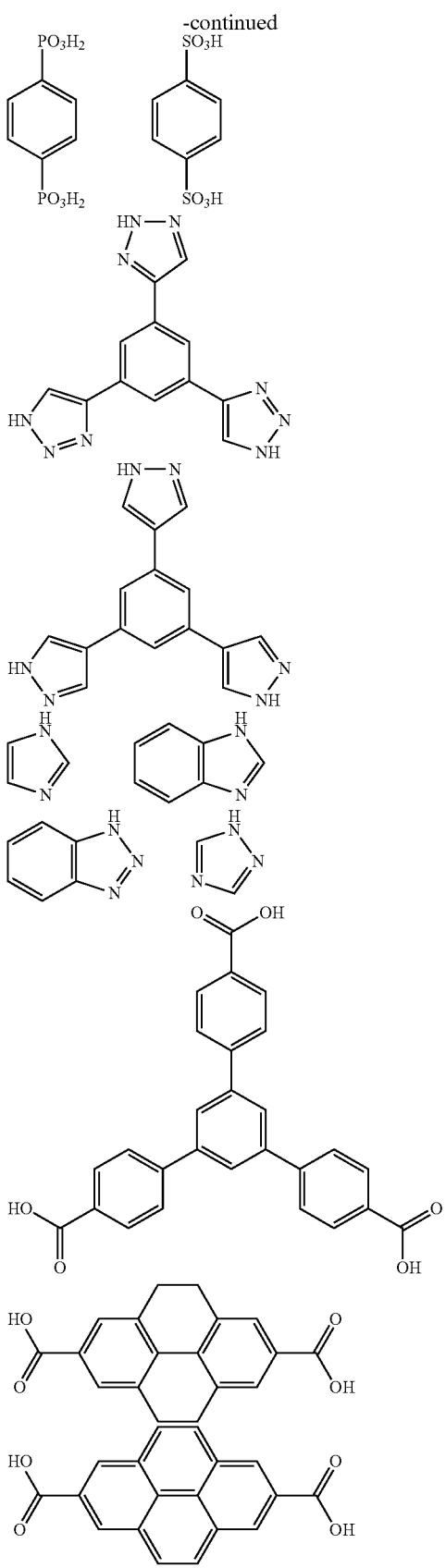

The metal-organic framework (MOF) may be, for example, Ti$_8$O$_8$(OH)$_4$[O$_2$C—C$_6$H$_4$—CO$_2$]$_6$, Cu(bpy) (H$_2$O)$_2$(BF$_4$)$_2$(bpy) {bpy=4,4'-bipyridine}, Zn$_4$O(O$_2$C—C$_6$H$_4$—CO$_2$)$_3$ (Zn- terephthalic acid-MOF, Zn-MOF), or Al(OH){O$_2$C—C$_6$H$_4$—CO$_2$}.

The inorganic particles may have various shapes. For example, the inorganic particle may have a spherical shape, an elliptical shape, a cubical shape, a tetrahedral shape, a pyramidal shape, an octahedral shape, a cylindrical shape, a polygonal pillar-like shape, a conical shape, a columnar shape, a tubular shape, a helical shape, a funnel shape, a dendritic shape, or any of various common regular and irregular shapes.

As used herein, the term "ionic liquid" refers to a salt in a liquid state at room temperature or a fused salt at room temperature that consists of only ions having a melting point equal to or below room temperature. For example, the ionic liquid for the protective layer may be at least one selected from compounds each including:

i) a cation of at least one selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, a triazolium cation, and a combination thereof, and ii) an anion of at least one selected from BF$_4^-$, PF$_6^-$, AsF$_6^-$, SbF$_6^-$, AlCl$_4^-$, HSO$_4^-$, ClO$_4^-$, CH$_3$SO$_3^-$, CF$_3$CO$_2^-$, Cl$^-$, Br$^-$, I$^-$, BF$_4^-$, SO$_4^-$, PF$_6^-$, CF$_3$SO$_3^-$, (FSO$_2$)$_2$N$^-$, (C$_2$F$_6$SO$_2$)$_2$N$^-$, (C$_2$F$_5$SO$_2$)(CF$_3$SO$_2$)N$^-$, and (CF$_3$SO$_2$)$_2$N$^-$.

For example, the ionic liquid may be at least one selected from N-methyl-N-propylpyrrolidinium bis(trifluoromethanesulfonyl)imide, N-butyl-N-methylpyrrolidinium bis(3-trifluoromethylsulfonyl)imide, 1-butyl-3-methylimidazolium bis(trifluoromethylsulfonyl)imide, and 1-ethyl-3-methylimidazolium bis(trifluoromethylsulfonyl)imide.

For example, the ionic liquid may be represented by Formula 5a, Formula 5b, or Formula 5c:

Formula 5a

Formula 5b

In Formulae 5a and 5b,

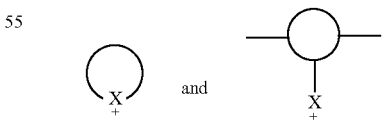

and are each independently a 3 to 31 membered group comprising 2 to 30 carbon atoms and optionally at least one heteroatom in addition to X;

X in Formulae 5a and 5b is independently S, —N(R$_5$) (R$_6$), —N(R$_5$), —P(R$_6$), or —P(R$_5$)(R$_6$); and Y$^-$ in Formulae 5a and 5b is an anion.

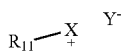

Formula 5c

In Formula 5c,

X is independently —N($R_5$)($R_6$), —N($R_5$), —P($R_6$), or —P($R_5$)($R_6$);

$R_{11}$ is an unsubstituted or substituted C1-C30 alkyl group, an unsubstituted or substituted C1-C30 heteroalkyl group, an unsubstituted or substituted C1-C30 alkoxy group, an unsubstituted or substituted C6-C30 aryl group, an unsubstituted or substituted C7-C30 arylalkyl group, an unsubstituted or substituted C6-C30 aryloxy group, an unsubstituted or substituted C6-C30 arylthio group, an unsubstituted or substituted C3-C30 heteroaryl group, an unsubstituted or substituted C4-C30 heteroarylalkyl group, an unsubstituted or substituted C3-C30 heteroaryloxy group, an unsubstituted or substituted C3-C30 heteroarylthio group, an unsubstituted or substituted C3-C30 cycloalkyl group, an unsubstituted or substituted C3-C30 cycloalkyloxy group, an unsubstituted or substituted C3-C30 heterocycloalkyl group, or an unsubstituted or substituted C2-C100 alkyleneoxide group; and $Y^-$ is an anion, and wherein in Formulae 5a, 5b, and 5c, $R_5$ and $R_6$ is each independently a hydrogen, an unsubstituted or substituted C1-C30 alkyl group, an unsubstituted or substituted C1-C30 heteroalkyl group, an unsubstituted or substituted C1-C30 alkoxy group, an unsubstituted or substituted C6-C30 aryl group, an unsubstituted or substituted C7-C30 arylalkyl group, an unsubstituted or substituted C6-C30 aryloxy group, an unsubstituted or substituted C6-C30 arylthio group, an unsubstituted or substituted C3-C30 heteroaryl group, an unsubstituted or substituted C4-C30 heteroarylalkyl group, an unsubstituted or substituted C3-C30 heteroaryloxy group, an unsubstituted or substituted C3-C30 heteroarylthio group, an unsubstituted or substituted C3-C30 cycloalkyl group, an unsubstituted or substituted C3-C30 cycloalkyloxy group, an unsubstituted or substituted C3-C30 heterocycloalkyl group, or an unsubstituted or substituted C2-C100 alkyleneoxide group.

For example,

in Formula 5a may be a cation that is represented by Formula 5d, and

in Formula 5c may be a cation that is represented by Formula 5e:

Formula 5d

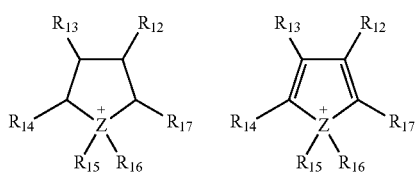

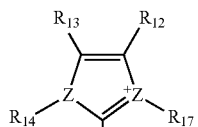

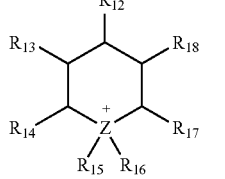 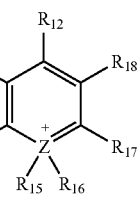

In Formula 5d,

Z denotes S, N, or P; and $R_{12}$ to $R_{18}$ are each independently a hydrogen, an unsubstituted or substituted C1-C30 alkyl group, an unsubstituted or substituted C1-C30 heteroalkyl group, an unsubstituted or substituted C1-C30 alkoxy group, an unsubstituted or substituted C6-C30 aryl group, an unsubstituted or substituted C7-C30 arylalkyl group, an unsubstituted or substituted C6-C30 aryloxy group, an unsubstituted or substituted C6-C30 arylthio group, an unsubstituted or substituted C3-C30 heteroaryl group, an unsubstituted or substituted C4-C30 heteroarylalkyl group, an unsubstituted or substituted C3-C30 heteroaryloxy group, an unsubstituted or substituted C3-C30 heteroarylthio group, an unsubstituted or substituted C3-C30 cycloalkyl group, an unsubstituted or substituted C3-C30 cycloalkyloxy group, an unsubstituted or substituted C3-C30 heterocycloalkyl group, an unsubstituted or substituted C3-C30 alkenyl group, an unsubstituted or substituted C3-C30 alkynyl group, or an unsubstituted or substituted C2-C100 alkyleneoxide group, provided that when Z denotes S, groups $R_{15}$ and $R_{16}$ are absent.

Formula 5e

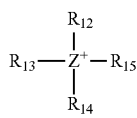

In Formula 5e,

Z denotes N or P; and $R_{12}$ to $R_{15}$ are each independently a hydrogen, an unsubstituted or substituted C1-C30 alkyl group, an unsubstituted or substituted C1-C30 heteroalkyl group, an unsubstituted or substituted C1-C30 alkoxy group, an unsubstituted or substituted C6-C30 aryl group, an unsubstituted or substituted C7-C30 arylalkyl group, an unsubstituted or substituted C6-C30 aryloxy group, an unsubstituted or substituted C6-C30 arylthio group, an unsubstituted or substituted C3-C30 heteroaryl group, an unsubstituted or substituted C4-C30 heteroarylalkyl group, an unsubstituted or substituted C3-C30 heteroaryloxy group, an unsubstituted or substituted C3-C30 heteroarylthio group, an unsubstituted or substituted C3-C30 cycloalkyl group, an unsubstituted or substituted C3-C30 cycloalkyloxy group, an unsubstituted or substituted C3-C30 heterocycloalkyl group, an unsubstituted or substituted C3-C30 alkenyl group, an unsubstituted or substituted C3-C30 alkynyl group, or an unsubstituted or substituted C2-C100 alkyleneoxide group.

For example, the amount of the ionic liquid may be in a range of about 5 parts to about 40 parts by weight, and in some embodiments, about 10 parts to about 20 parts by weight, based on 100 parts by weight of a total weight of the block copolymer including a structural domain and a hard domain. While not wishing to be bound by a theory, it is understood that when the amount of the ionic liquid is within these ranges, the protective layer may have improved ionic conductivity and improved mechanical characteristics.

When the protective layer includes an ionic liquid and a lithium salt, a mole ratio (IL/Li) of the ionic liquid to lithium ions may be in a range of about 0.1 to about 2.0, and in some embodiments, about 0.2 to about 1.8, and in some other embodiments, about 0.4 to about 1.5. While not wishing to be bound by a theory, it is understood that when the protective layer has a mole ratio of the ionic liquid to lithium ions within these ranges, the electrolyte may have high lithium ion mobility, high ionic conductivity, and improved mechanical characteristics to effectively suppress growth of lithium dendrite on the negative electrode surface of a lithium battery.

The polymer ionic liquid for the protective layer 11 may be, for example, a polymerization product of ionic liquid monomers, or a polymeric compound. The polymer ionic liquid is highly soluble in an organic solvent, and thus may further improve the ionic conductivity of the electrolyte.

In preparing a polymer ionic liquid by polymerization of ionic liquid monomers as described above, the resulting product from polymerization reaction may be washed and dried, and may be subsequently subjected to an anionic substitution reaction to obtain appropriate anions that may improve solubility of the polymerization product in an organic solvent.

In some embodiments, the polymer ionic liquid may include a repeating unit that includes:

i) a cation of at least one selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, a triazolium cation, and a combination thereof, and ii) an anion of at least one anion selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, $Cl^-$, $Br^-$, $I^-$, $SO_4^-$, $CF_3SO_3^-$, $(C_2F_5SO_2)_2N^-$, $(C_2F_5SO_2)(CF_3SO_2)N^-$, $NO_3^-$, $Al_2Cl_7^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, and $(OCF_3)_2C_2(CF_3)_2O)_2PO^-$.

In some embodiments, the polymer ionic liquid may be prepared by polymerization of ionic liquid monomers. These ionic liquid monomers may have a functional group polymerizable with a vinyl group, an aryl group, an acrylate group, and a methacrylate group, and may include a cation of at least one selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, a triazolium cation, and a combination thereof, and at least one of the above-listed anions.

Non-limiting examples of the ionic liquid monomers are 1-vinyl-3-ethylimidazolium bromide, a compound represented by Formula 6a, or a compound represented by Formula 6b.

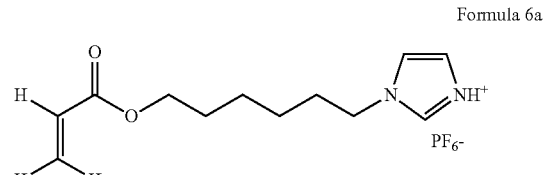

Formula 6a

Formula 6b

In an embodiment, the polymer ionic liquid may be represented by Formulae 7a and 7b:

Formula 7a

Formula 7b

In Formulae 7a and 7b, are each independently a 3 to 31 membered group comprising 2 to 30 carbon atoms and optionally at least one heteroatom in addition to X;

X is S, —N($R_5$)($R_6$), —N($R_5$), —P($R_6$), or —P($R_5$)($R_6$);

$R_1$ to $R_6$ are each independently a hydrogen, an unsubstituted or substituted C1-C30 alkyl group, an unsubstituted or substituted C1-C30 heteroalkyl group, an unsubstituted or substituted C1-C30 alkoxy group, an unsubstituted or substituted C6-C30 aryl group, an unsubstituted or substituted C7-C30 arylalkyl group, an unsubstituted or substituted C6-C30 aryloxy group, an unsubstituted or substituted C6-C30 arylthio group, an unsubstituted or substituted C3-C30 heteroaryl group, an unsubstituted or substituted C4-C30 heteroarylalkyl group, an unsubstituted or substituted C3-C30 heteroaryloxy group, an unsubstituted or substituted C3-C30 heteroarylthio group, an unsubstituted or substituted C3-C30 cycloalkyl group, an unsubstituted or substituted C3-C30 cycloalkyloxy group, an unsubstituted or substituted C3-C30 heterocycloalkyl group, or an unsubstituted or substituted C2-C100 alkyleneoxide group;

$Y^-$ is an anion;

a and b are each independently an integer of 1 to 5; and n is an integer of 500 to 2,800.

The "3 to 31 membered group comprising a 2 to 30 carbon atoms and optionally at least one heteroatom in addition to X" may be an unsubstituted or substituted heterocyclic ring including 2 to 30 carbon atoms, or an unsubstituted or substituted heteroaryl ring including 2 to 30 carbon atoms, wherein the heteroatom is one selected from a group consisting of N, O, P, and S.

In Formula 7a,

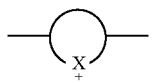

may be represented by Formula 7c:

Formula 7c

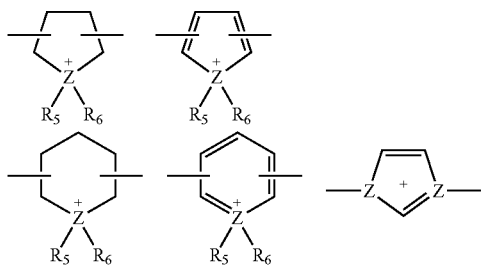

In Formula 7c,

Z denotes N, S, or P; and $R_5$ and $R_6$ are each independently a hydrogen, an unsubstituted or substituted C1-C30 alkyl group, an unsubstituted or substituted C1-C30 heteroalkyl group, an unsubstituted or substituted C1-C30 alkoxy group, an unsubstituted or substituted C6-C30 arylthio group, an unsubstituted or substituted C6-C30 aryl group, an unsubstituted or substituted C7-C30 arylalkyl group, an unsubstituted or substituted C6-C30 aryloxy group, an unsubstituted or substituted C3-C30 heteroaryl group, an unsubstituted or substituted C4-C30 heteroarylalkyl group, an unsubstituted or substituted C3-C30 heteroaryloxy group, an unsubstituted or substituted C3-C30 heteroarylthio group, an unsubstituted or substituted C3-C30 cycloalkyl group, an unsubstituted or substituted C3-C30 cycloalkyloxy group, an unsubstituted or substituted C3-C30 heterocycloalkyl group, an unsubstituted or substituted C3-C30 alkenyl group, an unsubstituted or substituted C3-C30 alkynyl group, or an unsubstituted or substituted C2-C100 alkyleneoxide group. When Z denotes S, groups $R_5$ and $R_6$ are absent.

For example, the polymer ionic liquid represented by Formula 7a may be a polymeric ionic liquid represented by Formula 7d:

Formula 7d

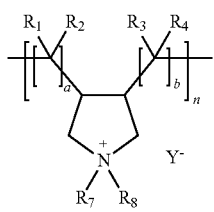

In Formula 7d, $R_1$ to $R_8$ are each independently a hydrogen, an unsubstituted or substituted C1-C30 alkyl group, an unsubstituted or substituted C1-C30 heteroalkyl group, an unsubstituted or substituted C1-C30 alkoxy group, an unsubstituted or substituted C6-C30 aryl group, an unsubstituted or substituted C7-C30 arylalkyl group, an unsubstituted or substituted C6-C30 aryloxy group, an unsubstituted or substituted C6-C30 arylthio group, an unsubstituted or substituted C3-C30 heteroaryl group, an unsubstituted or substituted C4-C30 heteroarylalkyl group, an unsubstituted or substituted C3-C30 heteroaryloxy group, an unsubstituted or substituted C3-C30 heteroarylthio group, an unsubstituted or substituted C3-C30 cycloalkyl group, an unsubstituted or substituted C3-C30 cycloalkyloxy group, an unsubstituted or substituted C3-C30 heterocycloalkyl group, or an unsubstituted or substituted C2-C100 alkyleneoxide group;

$Y^-$ is at least one selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $BF_4^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, and $(CF_3SO_2)_2N^-$;

a and b are each independently an integer of 1 to 5; and n is an integer of 500 to 2,800.

For example, in Formula 3, $R_7$ and $R_8$ are each independently C1-C10 alkyl group, $R_1$ to $R_4$ are each independently hydrogen or C1-C10 alkyl group, a and b is 1, and $Y^-$ is $BF_4^-$, $PF_6^-$, $ClO_4^-$, $CH_3SO_3^-$, $CF_3CO_2^-$, $(CF_3SO_2)_2N^-$, $CF_3SO_3^-$, $(C_2F_5SO_2)_2N^-$, or $(C_2F_5SO_2)(CF_3SO_2)N^-$.

For example, the polymer ionic liquid represented by Formula 7a may be a polymeric ionic liquid represented by Formula 7e:

Formula 7e

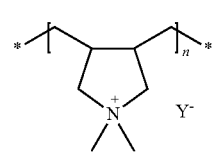

In Formula 7e, $Y^-$ is an anion, and n may be in a range of 500 to 2,800. For example, $Y^-$ in Formula 7e may be bis(trifluoromethanesulfonyl)imide (TFSI), bis(fluoromethanesulfonyl)imide, $BF_4$, or $CF_3SO_3$.

In an embodiment, the polymeric ionic liquid may be poly(diallyldimethylammonium)trifluoromethanesulfonylimide (poly(diallyldimethylammonium) TFSI).

In another example, the polymer ionic liquid represented by Formula 7b may be a compound represented by Formula 8.

Formula 8

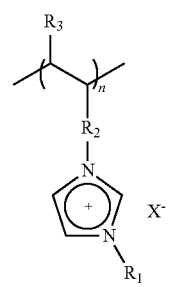

In Formula 8,

R$_1$ and R$_3$ may be each independently a hydrogen, a substituted or unsubstituted C1-C30 alkyl group, a substituted or unsubstituted C2-C30 alkenyl group, a substituted or unsubstituted C2-C30 alkynyl group, a substituted or unsubstituted C6-C30 aryl group, a substituted or unsubstituted C2-C30 heteroaryl group, or a substituted or unsubstituted C4-C30 carbocyclic group;

X$^-$ indicates an anion of the ionic liquid; and n may be from 500 to about 2,800.

The polymer ionic liquid may include, for example, a cation selected from poly(1-vinyl-3-alkylimidazolium) cation, poly(1-allyl-3-alkylimidazolium) cation, poly(1-(methacryloyloxy-3-alkylimidazolium) cation, and an anion selected from CH$_3$COO$^-$, CF$_3$COO$^-$, CH$_3$SO$_3$$^-$, CF$_3$SO$_3$$^-$, (CF$_3$SO$_2$)$_2$N$^-$, (FSO$_2$)$_2$N$^-$, (CF$_3$SO$_2$)$_3$C$^-$, (CF$_3$CF$_2$SO$_2$)$_2$N$^-$, C$_4$F$_9$SO$_3$$^-$, C$_3$F$_7$COO$^-$, and (CF$_3$SO$_2$)(CF$_3$CO)N$^-$. For example, the compound of Formula 8 may be polydiallydimethyl ammonium bis(trifluoromethanesulfonyl)imide.

In some embodiments, the polymer ionic liquid may include a low-molecular weight polymer, a thermally stable ionic liquid, and a lithium salt. The low-molecular weight polymer may have an ethylene oxide chain. The low-molecular weight polymer may be a glyme. Non-limiting examples of the glyme are polyethylene glycol dimethyl ether (polyglyme), tetraethyleneglycol dimethyl ether (tetraglyme), and triethyleneglycol dimethyl ether (triglyme). The low-molecular weight polymer may have a weight average molecular weight of about 75 to about 2,000, for example, a weight average molecular weight of about 250 to about 500.

The thermally stable ionic liquid may be the same as those listed above in conjunction with the above-described ionic liquid. The lithium salt may be any of the compounds described above as alkali metal salts as long as it includes lithium as an alkali metal.

The oligomer for the protective layer 11 may be at least one selected from polyethylene glycol dimethyl ether and polyethylene glycol diethyl ether. For example, the oligomer may have a weight average molecular weight of about 200 to about 2,000. For example, the amount of the oligomer may be in a range of about 5 parts to about 50 parts by weight based on 100 parts weight of the block copolymer. When the protective layer 11 further includes such an oligomer, the protective layer 11 may have further improved film formability, mechanical characteristics, and ionic conductivity.

In some embodiments, the protective layer may have has a thickness of about 1 µm to about 100 µm, in some embodiments, about 1 µm to about 50 µm, and in some embodiments about 1 µm to about 20 µm. The protective layer may have an ionic conductivity at about 25° C. of about 1×10$^{-4}$ Siemens per centimeter (S/cm) or greater, in some embodiments, about 5×10$^{-4}$ S/cm or greater, and in some other embodiments, about 1×10$^{-3}$ S/cm or greater. In some embodiments, the protective layer may have a tensile modulus (Young's modulus) at about 25° C. of about 10 mega Pascals (MPa) or greater, and in some embodiments, about 10 MPa to about 50 MPa. In some embodiments, the protective layer may have an elongation at about 25° C. of about 500% or greater, and in some embodiments, about 600% or greater, and in some other embodiments, about 1,200% or greater or about 1,300%. Thus, the protective layer, even at about 25° C., may have improved mechanical characteristics, including tensile modulus and ductility characteristics, and improved ionic conductivity that are both satisfactory for battery performance.

When the elongation of the protective layer is within these ranges, the protective layer may effectively suppress a volumetric change in the negative electrode. When the elongation of the protective layer is lower than these ranges, the protective layer may be damaged by dendrite grown on the lithium metal, and thus cause a short. In some embodiments, the protective layer may have both improved tensile modulus and ductility characteristics as described above to suppress a volumetric change in the negative electrode, and consequently effectively suppress the growth of dendrite.

In some embodiments, the protective layer may have a tensile strength at about 25° C. of about 2.0 MPa or greater. In some embodiments, an interfacial resistance (R$_i$) at about 25° C. of the protective layer with respect to the lithium metal that is obtained from a Nyquist plot through an impedance measurement may be about 10% or more smaller than the resistance of bare lithium metal. In some embodiments, since the interfacial resistance between the protective layer and the lithium metal electrode is lower than when bare lithium metal is used alone, the protective layer may have improved interfacial characteristics. In some embodiments, the protective layer may have an oxidation current or reduction current of about 0.05 milli Ampere per square centimeter (mA/cm$^2$) or less in a voltage range of about 0.0 V to about 6.0 V with respect to lithium metal.

In some embodiments, the protective layer may be formed as a free-standing membrane.

In some embodiments, the protective layer may be used in a lithium battery, for example, a lithium air battery, a lithium ion battery, a lithium polymer battery, or the like.

In some embodiments, the protective layer may be suitable for use in a high-voltage lithium battery, for example, having a charging voltage of about 4.0 V to about 5.5 V.

Hereinafter, a method of manufacturing a negative electrode for a lithium battery according to any of the above-described embodiments will be described.

First, a composition for forming a protective layer that includes a block copolymer including a structural domain and a hard domain as described above is prepared. An organic solvent may be further added to the protective layer-forming composition. The organic solvent may be any organic solvent available in the art. For example, the organic solvent may be tetrahydrofuran, N-methylpyrrolidone, acetonitrile, benzonitrile, 2-methyl tetrahydrofuran, γ-lactone-butyrolactone, dioxolane, 4-methyldioxolane, N,N-dimethylformamide, N,N-dimethylacetamide, N,N-dimethyl sulfoxide, dioxane, 1,2-dimethoxyethane, sulfolane, dichloroethane, chlorobenzene, nitrobenzene, diethyleneglycol, dimethyl ether, or a mixture thereof. The amount of the organic solvent may be in a range of about 100 parts to about 3,000 parts by weight based on 100 parts by weight of the block copolymer including a structural domain and a hard domain.

At least one selected from an ionic liquid and a polymer ionic liquid, and/or at least one selected from an inorganic particle and a lithium salt may be further added to the protective layer forming composition.

In forming a protective layer using the protective layer forming composition, the protective layer forming composition may be coated on at least a region of a lithium metal, and then dried, thereby to form a negative electrode for a lithium battery.

The coating may be performed using any coating method available to form a protective layer in the art, for example, spin coating, roll coating, curtain coating, extruding, casting, screen printing, inkjet printing, or doctor blading.

In some embodiments, the protective layer may have an oxidation current or reduction current of about 0.05 mA/cm$^2$ or less in a voltage range of about 0.1 V to about 6.0 V with respect to lithium metal. The protective layer may be electrochemically stable in a voltage range of about 0 V to about 6.0 V, and in some embodiments, about 0 V to about 5.0 V, and in some other embodiments, about 0 V to about 4.0 V. In some embodiments, the protective layer may have an electrochemically stable wide voltage window, and thus may be applicable in an electrochemical device operating at high voltage.

In some embodiments, a current density of the protective layer resulting from side reactions, not from intercalation/deintercalation of lithium, at a voltage of about 0 V may be about 0.05 mA/cm$^2$ or less, and in some embodiments, about 0.02 mA/cm$^2$ or less, and in some other embodiments, about 0.01 mA/cm$^2$ or less. For example, a current density of the protective layer resulting from oxidation reaction at a voltage of about 5.0 V with respect to lithium may be about 0.05 mA/cm$^2$ or less, and in some embodiments, about 0.04 mA/cm$^2$ or less, and in some other embodiments, about 0.02 mA/cm$^2$ or less.

According to another aspect of the present disclosure, a lithium battery includes a positive electrode, a negative electrode according to any of the above-described embodiments, and an electrolyte disposed between the positive electrode and the negative electrode. For example, the lithium battery may be a lithium battery.

The electrolyte may be a mixed electrolyte including at least one selected from a liquid electrolyte, a solid electrolyte, a gel electrolyte, and a polymer ionic liquid. The electrolyte may further include a separator.

The lithium battery may further include at least one selected from a liquid electrolyte, a polymer ionic liquid, a solid electrolyte, and a gel electrolyte.

At least one selected from a liquid electrolyte, a polymer ionic liquid, a gel electrolyte, and a solid electrolyte may be disposed between the positive electrode and the electrolyte in the lithium battery. The inclusion of at least one selected from a liquid electrolyte, a polymer ionic liquid, a solid electrolyte, and a gel electrolyte in the lithium battery may further improve the conductivity and mechanical characteristics of the electrolyte.

In some embodiments, the protective layer of the negative electrode in the lithium battery may further include a liquid electrolyte to allow the hard domain of the protective layer to form an ion conducting path along the liquid electrolyte. For example, the liquid electrolyte may further include at least one selected from an organic solvent, an ionic liquid, and a lithium salt.

For example, the organic solvent may be a carbonate compound, a glyme compound, or a dioxolane compound. Non-limiting examples of the carbonate compound are ethylene carbonate, propylene carbonate, dimethyl carbonate, fluoroethylene carbonate, diethyl carbonate, or ethylmethyl carbonate. The glyme compound may be, for example, at least one selected from poly(ethylene glycol) dimethyl (PEGDME, polyglyme), tetra(ethylene glycol) dimethyl ether (TEGDME, tetraglyme), tri(ethylene glycol) dimethyl ether (triglyme), poly(ethylene glycol) dilaurate (PEGDL), poly(ethylene glycol) monoacrylate (PEGMA), and poly (ethylene glycol) diacrylate (PEGDA). The dioxolane compound may be, for example, at least one selected from 3-dioxolane, 4,5-diethyl dioxolane, 4,5-dimethyl dioxolane, 4-methyl-1,3-dioxolane, and 4-ethyl-1,3-dioxolane. For example, the organic solvent may be 2,2-dimethoxy-2-phenyl acetophenone, dimethyl ether (DME), 1,2-dimethoxy ethane, 1,2-diethoxy ethane, tetrahydrofuran, gamma-butyrolactone, or 1,1,2,2-tetrafluoroethyl 2,2,3,3-tetrafluoropropyl ether.

The gel electrolyte for the lithium battery may be any electrode in gel form available in the art. For example, the gel electrolyte may include a polymer and a polymer ionic liquid. The polymer in the gel electrolyte may be, for example, a solid graft (block) copolymer electrolyte.

The solid electrolyte for the lithium battery may be an organic solid electrolyte or an inorganic solid electrolyte. Non-limiting examples of the organic solid electrolyte are polyethylene derivatives, polyethylene oxide derivatives, polypropylene oxide derivatives, phosphoric acid ester polymer, polyester sulfide, polyvinyl alcohol, polyfluoride vinylidene, and polymers including ionic dissociative groups. Non-limiting examples of the inorganic solid electrolyte are $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, $Li_3PO_4$—$Li_2S$—$SiSi_2$, $Cu_3N$, $LiPON$, $Li_2S$—$GeS_2$—$Ga_2S_3$, $Li_2O$-$11Al_2O_3$, (Na, Li)$_{1+x}$Ti$_{2-x}$Al$_x$(PO$_4$)$_3$ (wherein $0.1 \leq x \leq 0.9$), Li$_{1+x}$Hf$_{2-x}$Al$_x$(PO$_4$)$_3$ (wherein $0.1 \leq x \leq 0.9$), $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, a Na-Silicate, $Li_{0.3}La_{0.5}TiO_3$, $Na_5MSi_4O_{12}$ (wherein M is a rare earth element such as Nd, Gd, Dy, or the like), $Li_5ZrP_3O_{12}$, $Li_5TiP_3O_{12}$, $Li_3Fe_2P_3O_{12}$, $Li_4NbP_3O_{12}$, Li$_{1+x}$(M,Al,Ga)$_x$(Ge$_{1-y}$Ti$_y$)$_{2-x}$(PO$_4$)$_3$ (wherein $0 \leq x \leq 0.8$, $0 \leq y \leq 1.0$, and M is Nd, Sm, Eu, Gd, Tb, Dy, Ho, Er, Tm, or Yb), Li$_{1+x+y}$Q$_x$Ti$_{2-x}$Si$_y$P$_{3-y}$O$_{12}$ (wherein $0 < x \leq 0.4$, $0 < y \leq 0.6$, and Q is Al or Ga), $Li_6BaLa_2Ta_2O_{12}$, $Li_7La_3Zr_2O_{12}$, $Li_5La_3Nb_2O_{12}$, $Li_5La_3M_2O_{12}$ (wherein M is Nb or Ta), Li$_{7+x}$A$_x$La$_{3-x}$Zr$_2$O$_{12}$ (wherein $0 < x < 3$, and A is Zn).

In some embodiments, the lithium metal of the negative electrode in the lithium battery may be a lithium metal thin film electrode or a lithium metal alloy electrode, and the lithium battery may further include a liquid electrolyte between the electrolyte and the positive electrode, the liquid electrolyte including at least one selected from an organic solvent, an ionic liquid, and a lithium salt.

In some embodiments, a lithium battery may have improved capacity retention rate by using the negative electrode according to any of the above-described embodiments. The lithium battery including the negative electrode according to any of the above-described embodiments may have good voltage characteristics, high capacity, and high energy density, and thus may be widely used in mobile phones, laptop computers, storage batteries for power generating units using wind power or sunlight, electric vehicles, uninterruptable power supplies (UPS), household storage batteries, and the like.

FIGS. 2A to 2D are schematic views illustrating structures of lithium batteries according to exemplary embodiments of the present disclosure, including a protective layer according to any of the above-described embodiments.

Figure 2A:
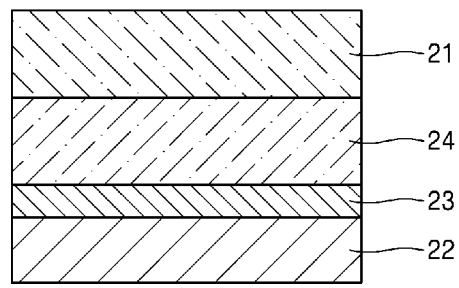
FIGS. 2A to 2D are schematic views illustrating structures of lithium batteries according to exemplary embodiments of the present disclosure.

Referring to FIG. 2A, a lithium battery according to an embodiment includes an electrolyte 24 between a positive electrode 21 and a negative electrode 22. The negative electrode 22 may be a lithium metal electrode. The lithium battery may further include a protective layer 23 between the electrolyte 24 and the negative electrode 22. The electrolyte 24 may further include at least one selected from a liquid electrolyte, a polymer ionic liquid, a solid electrolyte, and a gel electrolyte. The electrolyte 24 may further include a separator.

Due to the protective layer 23 disposed on at least a region of the negative electrode 22, the surface of the negative electrode 22 may become mechanically and electrochemically stable. This may suppress dendritic formation on the surface of the negative electrode 22 during charging and discharging of the lithium battery, and improve interfacial stability between the negative electrode 22 and the electrolyte 24.

When the protective layer 23 covers the entire surface of the negative electrode 22, the protective layer 23 may effectively protect the surface of the negative electrode 22. For example, the protective layer 23 may prevent direct contact between the negative electrode 22 and the electrolyte 24 that is between the positive electrode 21 and the negative electrode 22 and is highly reactive to the surface of the negative electrode 22. Accordingly, the protective layer 23 may protect the negative electrode 22, and improve stability of the negative electrode 22.

Figure 2B:
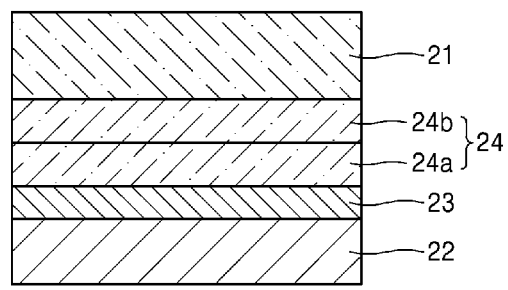

Referring to FIG. 2B, the electrolyte 24 may have a two-layer structure in which a liquid electrolyte 24 $a$ and a solid electrolyte 24 $b$ are sequentially stacked upon one another. The liquid electrolyte 24 $a$ may be disposed adjacent to the protective layer 23. Accordingly, a lithium battery of FIG. 2B according to another embodiment may have a stack structure of negative electrode/protective layer/electrolyte (liquid electrolyte/solid electrolyte)/positive electrode that are stacked in the stated order.

Figure 2C:
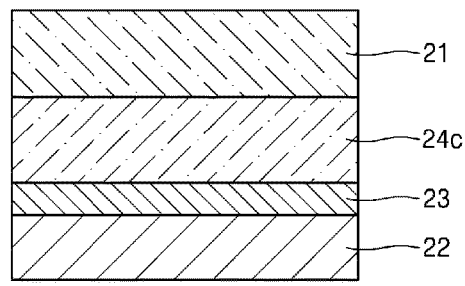

Referring to FIG. 2C, a lithium battery according to another embodiment may include a separator 24c. The separator 24c may be a monolayer or a multilayer including at least two layers of polyethylene, polypropylene, polyvinylidene fluoride, or a combination thereof. For example, the separator 24c may be a mixed multilayer, such as a two-layer separator of polyethylene/polypropylene, a three-layer separator of polyethylene/polypropylene/polyethylene, or a three-layer separator of polypropylene/polyethylene/polypropylene. The separator 24c may include an electrolyte including a lithium salt and an organic solvent.

Figure 2D:
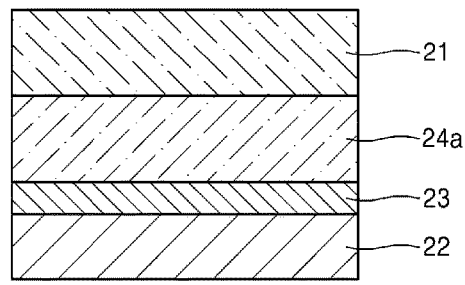

Referring to FIG. 2D, a lithium battery according to another embodiment may include a liquid electrolyte 24 $a$. The liquid electrolyte 24 $a$ may have the same or different composition from a liquid electrolyte that may be included in the protective layer 23.

In FIGS. 2A to 2D, the positive electrode 21 may be a porous positive electrode. The porous positive electrode may be a positive electrode including pores, or any positive electrode that allows permeation of liquid electrolyte thereinto by capillary action.

For example, the porous positive electrode may be a positive electrode that may be obtained by coating a positive active material composition including a positive active material, a conducting agent, a binder, and a solvent, and drying the resulting structure. The resulting positive electrode may include pores among particles of the positive active material. The porous positive electrode may be impregnated with liquid electrolyte.

In some embodiments, the positive electrode 21 may include a liquid electrolyte, a gel electrolyte, a solid electrolyte, or the like. The liquid electrolyte, the gel electrolyte, and the solid electrolyte may be any electrolytes available for lithium batteries in the art that do not react with the positive active material, and thus prevent deterioration of the positive active material during charging and discharging.

In FIGS. 2A to 2D, the negative electrode 22 may be a lithium metal thin film or a lithium metal alloy thin film. The lithium metal thin film or lithium metal alloy thin film may have a thickness of about 100 μm or less. While not wishing to be bound by a theory, it is understood that when the thickness of the lithium metal thin film or lithium metal alloy thin film is about 100 μm or less, the lithium battery may have stable cycle characteristics. For example, the lithium metal thin film or lithium metal alloy thin film of the lithium battery may have a thickness of about 80 μm or less, and in some embodiments, about 60 μm or less, and in some other embodiments, about 0.1 μm to about 60 μm. According to the prior art, when such a lithium metal thin film or lithium metal alloy thin film in a conventional lithium battery has a thickness of 100 μm or less, it is difficult to implement a lithium battery with stable cycle characteristics since the thickness of the lithium metal thin film or lithium metal alloy thin film may be reduced due to a side reaction, dendritic formation, or the like. However, a lithium battery with stable cycle characteristics may be manufactured using any of the protective layers according to the above-described embodiments.

Figure 3:
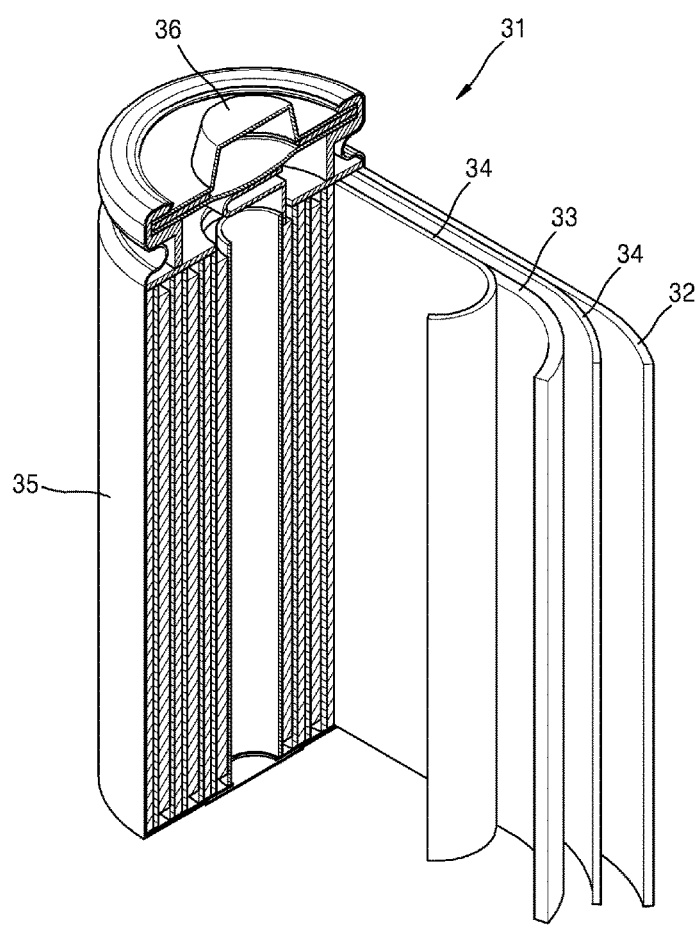
FIG. 3 is an exploded perspective view of a lithium battery according to another exemplary embodiment.

FIG. 3 is an exploded perspective view illustrating a structure of a lithium battery 31 according to another exemplary embodiment.

Referring to FIG. 3, the lithium battery 31 may include a positive electrode 33, a negative electrode 32 according to any of the above-described embodiments, and an electrolyte 34. The positive electrode 33, the negative electrode 32, and the electrolyte 34 may be rolled or folded and then be accommodated in a battery case 35, followed by injecting an liquid electrolyte into the battery case 35 and sealing with a cap assembly 36, thereby completing the manufacture of the lithium battery 31. The battery case 35 may be a cylindrical, rectangular, or thin-film type. For example, the lithium battery 31 may be a large thin-film battery.

In some embodiments, the lithium battery 31 may have an operation voltage of about 4.0 V to about 5.0 V, for example, about 4.5 V to about 5.0 V.

Each component of a lithium battery including any of the negative electrodes according to the above-described embodiments, and a method of manufacturing a lithium battery including such components will be described in greater detail.

A positive active material for the positive electrode may include at least one selected from lithium cobalt oxide, lithium nickel cobalt manganese oxide, lithium nickel cobalt aluminum oxide, lithium iron phosphate, and lithium manganese oxide, but is not limited thereto. Any positive active material available in the art may be used.

For example, the positive active material may be a compound represented by one of the following formulae: $Li_aA_{1-b}B'_bD'_2$ (wherein $0.90 \leq a \leq 1.8$ and $0 \leq b \leq 0.5$); $Li_aE_{1-b}B'_bO_{2-c}D'_c$ (wherein $0.90 \leq a \leq 1.8$, $0 \leq b \leq 0.5$, and $0 \leq c \leq 0.05$); $LiE_{2-b}B'_bO_{4-c}D'_c$ (wherein $0 \leq b \leq 0.5$ and $0 \leq c \leq 0.05$); $Li_aNi_{1-b-c}Co_bB'_cD'_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F_\alpha$ (wherein $0.90 \leq a \leq 1.8$, $0 \leq b \leq 0.05$, $0 \leq c \leq 0.05$, and $0 < \alpha < 2$); $Li_aNi_{1-b-c}Co_bB'_cO_{2-\alpha}F_\alpha$ (wherein $0.90 \leq a \leq 1.8$, $0 \leq b \leq 0.05$, $0 \leq c \leq 0.05$, and $0 < \alpha \leq 2$); $Li_aNi_{1-b-c}Mn_bB'_cD'_\alpha$ (wherein $0.90 \leq a \leq 1.8$, $0 \leq b \leq 0.05$, $0 \leq c \leq 0.05$, and $0 < \alpha < 2$); $Li_aNi_{1-b-c}Mn_bB'_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$ and $0.001 \leq b \leq 0.1$); $Li_aCoG_bO_2$ (wherein $0.90 \leq a \leq 1.8$ and $0.001 \leq b \leq 0.1$); $Li_aMnG_bO_2$ (wherein $0.90 \leq a \leq 1.8$ and $0.001 \leq b \leq 0.1$); $Li_aMn_2GbO_4$ (wherein $0.90 \leq a \leq 1.8$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$.

In the formulae above, A may be selected from nickel (Ni), cobalt (Co), manganese (Mn), and combinations thereof; B' may be selected from aluminum (Al), nickel (Ni), cobalt (Co), manganese (Mn), chromium (Cr), iron (Fe), magnesium (Mg), strontium (Sr), vanadium (V), a rare earth element, and combinations thereof; D' may be selected from oxygen (O), fluorine (F), sulfur (S), phosphorus (P), and combinations thereof; E may be selected from cobalt (Co), manganese (Mn), and combinations thereof; F may be selected from fluorine (F), sulfur (S), phosphorus (P), and combinations thereof; G is selected from aluminum (Al), chromium (Cr), manganese (Mn), iron (Fe), magnesium (Mg), lanthanum (La), cerium (Ce), strontium (Sr), vanadium (V), and combinations thereof; Q may be selected from titanium (Ti), molybdenum (Mo), manganese (Mn), and combinations thereof; I' may be selected from chromium (Cr), vanadium (V), iron (Fe), scandium (Sc), yttrium (Y), and combinations thereof; and J may be selected from vanadium (V), chromium (Cr), manganese (Mn), cobalt (Co), nickel (Ni), copper (Cu), and combinations thereof.

For example, the positive active material may be a compound represented by Formula 9, a compound represented by Formula 10, or a compound represented by Formula 11.

$$Li_aNi_bCo_cMn_dO_2 \qquad \text{Formula 9}$$

In Formula 9, $0.90 \leq a \leq 1.8$, $0 \leq b \leq 0.9$, $0 \leq c \leq 0.5$, and $0 \leq d \leq 0.5$.

$$Li_2MnO_3 \qquad \text{Formula 10}$$

$$LiMO_2 \qquad \text{Formula 11}$$

In Formula 11, M may be Mn, Fe, Co, or Ni.

The positive electrode may be manufactured as follows.

A positive active material, a binder, and a solvent are mixed to prepare a positive active material composition. A conducting agent may be further added into the positive active material composition. The positive active material composition is directly coated on a metallic current collector and dried to prepare a positive electrode plate. Alternatively, the positive active material composition may be cast on a separate support to form a positive active material film, which may then be separated from the support and then laminated on a metallic current collector to prepare a positive electrode plate.

The current collector may be a metal such as nickel, aluminum, titanium, copper, gold, silver, platinum, an aluminum alloy, or stainless steel, a film prepared by plasma-spraying or arc-spraying a carbonaceous material, activated carbon fiber, nickel, aluminum, zinc, copper, tin, lead, and any alloy thereof, or a conductive film prepared by dispersing a conductive material in a rubber or a resin such as styrene-ethylene-butylene-styrene copolymer (SEBS). For example, aluminum, nickel, or stainless steel may be used. Particularly, aluminum may be used since it can be easily processed into a thin film and is inexpensive. A shape of the current collector is not particularly limited. For example, the current collector may have a thin film shape, a flat plate shape, a mesh shape, a net shape, a punched shape, an embossing shape, or any combination thereof, e.g. a mesh shape flat plate or the like. For example, the current collector may have an uneven surface formed by etching.

The binder is a composition that contributes binding with an active material and a conductive material and binding with a current collector, and thus an amount of the binder added is from about 1 part to about 50 parts by weight based on 100 parts by weight of the total weight of the positive electrode active material. Examples of the binder include polyvinylidene fluoride (PVDF), polyvinyl alcohol, carboxymethylcellulose (CMC), starch, hydroxypropylcellulose, reproduced cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, and various copolymers. A content of the binder is from about 2 parts to about 5 parts by weight based on 100 parts by weight of the total weight of the positive electrode active material. When a content of the binder is within this range, a binding force of the active material layer with respect to the current collector is satisfactory.

The conductive agent may be any material that does not cause chemical change in the battery and have conductivity. Examples of the conductive agent include graphite such as natural graphite or artificial graphite; carbon blacks, such as carbon black, acetylene black, Ketjen black, channel black, furnace black, lamp black, or summer black; conductive fibers, such as carbon fibers or metal fibers; carbon fluoride; metal powder, such as aluminum or nickel powder; conductive whisky, such as zinc oxide or potassium titanate; a conductive metal oxide, such as a titanium oxide; and a conductive material, such as a polyphenylene derivative.

A content of the conducting agent may be from about 1 parts to about 10 parts by weight for example, from about 1 parts to about 5 parts by weight based on 100 parts by weight of the total weight of the positive electrode active material. When a content of the conducting agent is within this range, the finally obtained electrode may have excellent conductivity characteristic.

Examples of the solvent include N-methylpyrrolidone.

A content of the solvent is from about 100 parts to about 2,000 parts by weight based on 100 parts by weight of the positive electrode active material. When a content of the solvent is within this range, a process for forming the active material layer may be easily carried out.

The amounts of the positive active material, the conducting agent, the binder, and the solvent may be amounts that are generally used in lithium batteries in the art. At least one of the conducting agent and the solvent may not be used depending on the use and the structure of the lithium battery.

The negative electrode may be a lithium metal thin film or a lithium metal alloy thin film.

A lithium metal alloy for the negative electrode may include lithium, and a metal/metalloid alloyable with lithium. Examples of the metal/metalloid alloyable with lithium are Si, Sn, Al, Ge, Pb, Bi, Sb, a Si—Y alloy (wherein Y is an alkali metal, an alkali earth metal, a Group 13 element, a Group 14 element, a transition metal, a rare earth element, or a combination thereof except for Si), a Sn—Y alloy (wherein Y is an alkali metal, an alkali earth metal, a Group 13 element, a Group 14 element, a transition metal, a rare earth element, or a combination thereof except for Sn), and $MnO_x$ (wherein $0<x\leq 2$). Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), or combinations thereof.

The electrolyte of the lithium battery may be a separator and/or a lithium salt-containing non-aqueous electrolyte that are in common use in lithium batteries in the art.

The separator may be an insulating thin film having high ion permeability and high mechanical strength. The separator may have a pore diameter of about 0.01 µm to about 10 µm, and a thickness of about 5 µm to about 20 µm. Examples of the separator are olefin polymers, such as polypropylene, and sheets or non-woven fabric made of glass fiber or polyethylene. When the electrolyte of the lithium battery is a solid polymer electrolyte, the solid polymer electrolyte may also serve as a separator.

For example, the separator may be a monolayer or a multilayer including at least two layers of polyethylene, polypropylene, polyvinylidene fluoride, or a combination thereof. The multilayer may be a mixed multilayer. For example, the separator may be a two-layered separator including polyethylene and polypropylene layers, a three-layered separator including polyethylene, polypropylene and polyethylene layers, or a three-layered separator including polypropylene, polyethylene and polypropylene layers.

The lithium salt-containing non-aqueous electrolyte may include a non-aqueous electrolyte and a lithium salt.

The non-aqueous electrolyte may be a non-aqueous liquid electrolyte, an organic solid electrolyte, or an inorganic solid electrolyte. The non-aqueous liquid electrolyte may include an organic solvent. The organic solvent may be any organic solvent available in the art. For example, the organic solvent may be propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, chloroethylene carbonate, benzonitrile, acetonitrile, tetrahydrofuran, 2-methyltetrahydrofuran, γ-butyrolactone, dioxolane, 4-methyldioxolane, N,N-dimethyl formamide, N,N-dimethyl acetamide, dimethylsulfoxide, dioxane, 1,2-dimethoxyethane, sulfolane, dichloroethane, chlorobenzene, nitrobenzene, diethylene glycol, dimethyl ether, or a mixture thereof.

For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are natural numbers), LiCl, LiI, or a mixture thereof.

To improve charge-discharge characteristics and resistance to flame, pyridine, triethylphosphate, triethanolamine, cyclic ether, ethylene diamine, n-glyme, hexamethyl phosphoramide, nitrobenzene derivative, sulfur, quinone imine dye, N-substituted oxazolidinone, N,N-substituted imidazolidine, ethylene glycol dialkyl ether, ammonium salt, pyrrole, 2-methoxyethanol, or aluminum trichloride may be added to the non-aqueous electrolyte. In some embodiments, to provide non-flammable characteristics, a halogen-containing solvent such as carbon tetrachloride, ethylene trifluoride, or the like may be further added to the non-aqueous electrolyte, if desired.

In some embodiments, the lithium battery may have improved capacity and improved lifetime characteristics, and thus may be used in a battery cell for use as a power source of a small device, and may also be used as a unit battery of a medium-large size battery pack or battery module that include a plurality of battery cells for use as a power source of a medium-large size device.

Examples of the medium-large size device are electric vehicles (EVs), including hybrid electric vehicles (HEVs) and plug-in hybrid electric vehicles (PHEVs); electric two-wheeled vehicles, including E-bikes and E-scooters; power tools; power storage devices; and the like, but are not limited thereto.

As used herein, the term "alkyl" refers to a completely saturated branched or unbranched (or straight-chained or linear) hydrocarbon group. Non-limiting examples of the "alkyl" group are methyl, ethyl, n-propyl, isopropyl, n-butyl, isobutyl, sec-butyl, n-pentyl, isopentyl, neopentyl, iso-amyl, n-hexyl, 3-methylhexyl, 2,2-dimethylpentyl, 2,3-dimethylpentyl, and n-heptyl.

At least one hydrogen atom of the alkyl group may be substituted with a halogen atom, a C1-C20 alkyl group substituted with a halogen atom (for example, $CCF_3$, $CHCF_2$, $CH_2F$, $CCl_3$, and the like), a C1-C20 alkoxy group, a C2-C20 alkoxyalkyl group, a hydroxyl group, a nitro group, a cyano group, an amino group, an amidino group, a hydrazine group, a hydrazone group, a carboxyl group or a salt thereof, a sulfonyl group, a sulfamoyl group, a sulfonic acid group or a salt thereof, a phosphoric acid group or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, a C7-C20 heteroarylalkyl group, a C6-C20 heteroaryloxy group, a C6-C20 heteroaryloxyalkyl group, or a C6-C20 heteroarylalkyl group.

As used herein, the term "halogen atom" indicates fluorine, bromine, chloride, iodine, and the like.

As used herein, the term "heteroalkyl" refers to an alkyl group as defined above in which at least one carbon atom is replaced with a heteroatom selected from nitrogen (N), oxygen (O), phosphorus (P), or sulfur (S) and having carbon as remaining cyclic atoms. Non-limiting examples of the heteroalkyl are methylthio, dimethylamino, and the like.

As used herein, the term "alkenyl" group indicates a branched or unbranched hydrocarbon with at least one carbon-carbon double bond. Non-limiting examples of the alkenyl group are vinyl, aryl, butenyl, isopropenyl, and isobutenyl. At least one hydrogen atom in the alkenyl group may be substituted with any of the substituents for the alkyl group as described above.

As used herein, the term "alkynyl" indicates a branched or unbranched hydrocarbon with at least one carbon-carbon triple bond. Non-limiting examples of the "alkynyl" group are ethynyl, butynyl, isobutynyl, and isopropynyl. At least one hydrogen atom of the "alkynyl" group may be substituted with any of the substituents for the alkyl group as described above.

As used herein, the term "alkoxy" refers to "alkyl-O—", wherein the term "alkyl" has the same meaning as described above. Non-limiting examples of the alkoxy are methoxy, ethoxy, n-propoxy, iso-propoxy, n-butoxy, iso-butoxy, sec-butoxy, tert-butoxy, pentyloxy, and hexyloxy. In the alkoxy group, at least one hydrogen atom may be substituted with the same groups as described above in connection with the alkyl group.

As used herein, the term "alkoxyalkyl" refers to an alkyl group substituted with the alkoxy group described above. Non-limiting examples of the alkoxyalkyl are methoxymethyl and methoxyethyl. At least one hydrogen atom of the alkoxyalkyl may be substituted with the same groups as described above in connection with the alkyl group.

As used herein, the term "aryl" is construed as including a group with an aromatic ring fused to at least one carbocyclic group cycloalkyl ring. Non-limiting examples of the "aryl" group are phenyl, naphthyl, and tetrahydronaphthyl.

At least one hydrogen atom of the "aryl" group may be substituted with any of the substituents for the alkyl group as described above.

As used herein, the term "arylalkyl" refers to an alkyl group substituted with an aryl group. Non-limiting examples of the arylalkyl are benzyl and phenyl-$CH_2CH_2$—.

As used herein, the term "aryloxy" refers to O-aryl, and non-limiting examples of the aryloxy group are phenoxy and the like. At least one hydrogen atom in the aryloxy group may be substituted with the same groups as described above in connection with the alkyl group.

As used herein, the term "arylthio refers to aryl-S—, wherein the aryl group is as described above. Non-limiting examples of the arylthio are phenylthio, naphthylthio, tetrahydronaphthylthio, and the like. At least one hydrogen atom in the arylthio group may be substituted with the same groups as described above in connection with the alkyl group.

As used herein, the term "heteroaryl" group indicates a monocyclic or bicyclic organic compound including at least one heteroatom selected from among nitrogen (N), oxygen (O), phosphorous (P), and sulfur (S), wherein the rest of the cyclic atoms are all carbon. The heteroaryl group may include, for example, one to five heteroatoms, and in some embodiments, may include a five- to ten-membered ring. In the heteroaryl group, S or N may be present in various oxidized forms. Non-limiting examples of the heteroaryl group are thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiaxolyl, 1,2,3-thiadiazolyl, 1,2,4-thiadiazolyl, 1,2,5-thiadiazolyl, 1,3,4-thiadiazolyl, isothiazol-3-yl, isothiazol-4-yl, isothiazol-5-yl, oxazol-2-yl, oxazol-4-yl, oxazol-5-yl, isoxazol-3-yl, isoxazol-4-yl, isoxazol-5-yl, 1,2,4-triazol-3-yl, 1,2,4-triazol-5-yl, 1,2,3-triazol-4-yl, 1,2,3-triazole-5-yl, tetrazolyl, pyrid-2-yl, pyrid-3-yl, 2-pyrazine-2-yl, pyrazine-4-yl, pyrazine-5-yl, 2-pyrimidine-2-yl, 4-pyrimidine-2-yl, or 5-pyrimidin-2-yl.

The term "heteroaryl" indicates a heteroaromatic ring fused to at least one of an aryl group, a cycloaliphatic group, and a heterocyclic group.

As used herein, the term "heteroarylalkyl" refers to an alkyl group substituted with heteroaryl. At least one hydrogen atom in the heteroarylalkyl group may be substituted with the same groups as described above in connection with the alkyl group.

As used herein, the term "heteroaryloxy" refers to an O-heteroaryl moiety. Non-limiting examples of the heteroaryloxy are 2-pyridyloxy and the like. At least one hydrogen atom in the heteroaryloxy group may be substituted with the same groups as described above in connection with the alkyl group.

As used herein, the term "heteroarylthio group" refers to an heteroaryl-S moiety. Non-limiting examples of the heteroarylthio are 2-pyridylthio and the like. At least one hydrogen atom in the heteroarylthio group may be substituted with the same groups as described above in connection with the alkyl group.

As used herein, the term "heteroaryloxyalkyl" refers to an alkyl group substituted with heteroaryloxy. Non-limiting examples of the heteroaryloxyalkyl are 2-pyridyloxymethyl and the like. At least one hydrogen atom in the heteroaryloxyalkyl group may be substituted with the same groups as described above in connection with the alkyl group.

As used herein, the term "carbocyclic" group indicates a saturated or partially unsaturated non-aromatic monocyclic, bicyclic or tricyclic hydrocarbon group. Non-limiting examples of the monocyclic hydrocarbon group are cyclopentyl, cyclopentenyl, cyclohexyl, and cyclohexenyl. Non-limiting examples of the bicyclic hydrocarbon group are bornyl, decahydronaphthyl, bicyclo[2.1.1]hexyl, bicyclo[2.2.1]heptyl, bicyclo[2.2.1]heptenyl, or bicyclo[2.2.2]octyl. A non-limiting example of the tricyclic hydrocarbon is adamantyl.

As used herein, the term "cycloalkyloxy" refers to "cycloalkyl-O—", wherein the term "cycloalkyl" has the same meaning as described above. Non-limiting examples of the cycloalkyloxy are cyclopropyloxy, cyclohexyloxy, and the like. In the cycloalkyloxy group, at least one hydrogen atom may be substituted with the same groups as described above in connection with the alkyl group.

As used herein, the term "heterocyclic" group indicates a C5-20 cyclic hydrocarbon group, for example, C5-C10 cyclic hydrocarbon group, including at least one hetero atom. For example, the at least one hetero atom is selected from S, N, O, and B.

As used herein, the terms "alkoxy", "aryloxy", and "heteroaryloxy" indicate alkyl, aryl, and heteroaryl, respectively, each bound to oxygen atom.

Thereinafter, one or more embodiments of the present disclosure will be described in detail with reference to the following examples. However, these examples are not intended to limit the scope of the one or more embodiments of the present disclosure.

Example 1: Preparation of Protective Layer

A polystyrene-b-poly(ethylene-ran-butylene)-b-polystyrene block copolymer was added to anhydrous tetrahydrofuran (THF) to obtain a 5 percent by weight (wt %) block copolymer-including mixture. A mixed ratio of a polystyrene block, a poly(ethylene-ran-butylene) block, and a polystyrene block in the (polystyrene-b-poly(ethylene-ran-butylene)-b-polystyrene) block copolymer was about 14.5:71:14.5. The poly(ethylene-ran-butylene) block presents a random copolymer, and a mixed weight ratio of the polyethylene unit and the polybutylene block was about 1:1. The polystyrene-b-poly(ethylene-ran-butylene)-b-polystyrene block copolymer had a weight average molecular weight of about 100,000 Daltons.

Lithium bis(fluorosulfonyl) imide (LiFSI, $LiN(SO_2F)_2$) was added to the block copolymer-including mixture to obtain a protective layer forming composition. The amount of LiFSI was about 30 parts by weight based on 100 parts by weight of the block copolymer.

After the protective layer forming composition was cast on a substrate, THF in the resulting cast product was slowly evaporated at about 25° C. for about 24 hours in an argon glove box, followed by drying under vacuum at about 40° C. for about 24 hours, thereby preparing a protective layer in membrane form. The protective layer had a thickness of about 2.5 micrometers (μm).

Example 2: Preparation of Protective Layer

A protective layer was prepared in the same manner as in Example 1, except that a polystyrene-b-poly(ethylene-ran-butylene)-b-polystyrene block copolymer including a polystyrene block, a poly(ethylene-ran-butylene) block, and a polystyrene block in a mixed weight ratio of about 25:50:25 was used.

Example 3: Preparation of Protective Layer

A protective layer was prepared in the same manner as in Example 1, except that a polystyrene-b-poly(ethylene-ranbutylene)-b-polystyrene block copolymer including a polystyrene block, a poly(ethylene-ran-butylene) block, and a polystyrene block in a mixed weight ratio of about 5:90:5 was used.

Reference Example 1: Preparation of Protective Layer

A polystyrene-b-poly(ethylene oxide)-b-polystyrene (PS-b-PEO-b-PS) block copolymer (12-59-12 kilograms per mole (kg/mol), available from Polymer Source, number average molecular weight (Mn)=98,000 Daltons) was dissolved in a 5 wt % anhydrous THF solution to obtain a first solution.

Lithium trifluoromethanesulfonimide (LiTFSI) powder was added to the first solution in a 20:1 mole ratio of ethylene oxide to lithium ions (EO/Li) and dissolved to obtain a second solution.

N-butyl-N31methylpyrrolidinium bis(3-trifluoromethanesulfonyl)imide ($PYR_{14}TFSI$, ≥98% HPLC grade, number average molecular weight (Mn)=422.41 Daltons, available from C-TRI), 10 wt % of poly(ethylene glycol) dimethyl ether (PEGDME, ≥99% HPLC grade, Mn=250 Daltons, available from Sigma Aldrich), and 5 wt % of Si having an average particle diameter of about 7 nanometers (nm) were added to the second solution to obtain a mixture. The mole ratio of the ionic liquid to lithium ions (IL/Li) was about 0.1.

The mixture was stirred at room temperature (25° C.) for about 24 hours, followed by sonication to a protective layer forming composition. After the protective layer forming composition was cast on a Teflon dish, THF in the resulting cast product was slowly evaporated at about 25° C. for about 24 hours in an argon glove box, followed by drying under vacuum at about 60° C. for about 24 hours, thereby preparing a protective layer in membrane form. The protective layer had a thickness of about 5 μm.

Example 4: Manufacture of Lithium Battery

The protective layer forming composition of Example 1 was coated on a lithium metal thin film (having a thickness of about 20 μm) by using a doctor blade to a thickness of about 5 μm, dried at about 25° C., and then thermally treated at about 40° C. under vacuum to manufacture a lithium metal negative electrode with a protective layer on lithium metal.

$LiCoO_2$, a conducting agent (Super-P, available from Timcal Ltd.), polyvinylidene fluoride (PVdF), and N-pyrrolidone were mixed together to obtain a positive electrode composition. A mixed weight ratio of $LiCoO_2$, the conducting agent, and PVdF in the positive electrode composition was about 97:1.5:1.5.

The positive electrode composition was coated on an aluminum foil (having a thickness of about 15 μm), dried at about 25° C., and then further dried at about 110° C. under vacuum to manufacture a positive electrode.

The positive electrode was assembled with the lithium metal negative electrode (having a thickness of about 20 μm) having the protective layer and a polyethylene/polypropylene separator, in such a way that the separator was disposed between the positive electrode and the lithium metal negative electrode, thereby manufacturing a lithium battery (coin cell). A liquid electrolyte was injected in between the positive electrode and the protective layer. The liquid electrolyte was obtained by dissolving a 1.3 molar (M) $LiPF_6$ lithium salt in a mixed solvent of diethyl carbonate (DEC) and fluoroethylene carbonate (FEC) in a volume ratio of about 6:4.

Examples 5 and 6: Manufacture of Lithium Battery

Lithium batteries were manufactured in the same manner as in Example 4, except that the protective layer forming compositions of Examples 2 and 3, instead of the protective layer forming composition of Example 1, were used, respectively.

Example 7: Manufacture of Lithium Battery

A lithium battery as full cell having a capacity of about 200 milli Ampere hours (mAh) was manufactured in the same manner as in Example 4, except that a liquid electrolyte obtained by dissolving 1 M LiFSi in a mixed solvent of dimethyl ether (DME) and 1,1,2,2-tetrafluoroethyl 2,2,3,3-tetrafluoropropyl ether (TTE) in a volume ratio of about 2:8 was used.

Reference Example 2: Manufacture of Lithium Battery

A lithium battery was manufactured in the same manner as in Example 4, except that the protective layer forming composition of Reference Example 1, instead of the protective layer forming composition of Example 1, was used.

Comparative Example 1: Manufacture of Lithium Battery $LiCoO_2$, a conducting agent (Super-P, available from Timcal Ltd.), polyvinylidene fluoride (PVdF), and N-pyrrolidone were mixed together to obtain a positive electrode composition. A mixed weight ratio of $LiCoO_2$, the conducting agent, and PVdF in the positive electrode composition was about 97:1.5:1.5.

The positive electrode composition was coated on an aluminum foil (having a thickness of about 15 μm), dried at about 25° C., and then further dried at about 110° C. under vacuum to manufacture a positive electrode.

A lithium battery was manufactured with a polypropylene separator (Cellgard 3510) and a liquid electrolyte that were disposed between the positive electrode and a lithium metal thin film (having a thickness of about 20 μm). The liquid electrolyte was obtained by dissolving 1.3 M $LiPF_6$ in a mixed solvent of diethyl carbonate (DEC) and fluoroethylene carbonate (FEC) in a volume ratio of about 6:4.

Comparative Example 2: Manufacture of Lithium Battery

A lithium battery as full cell having a capacity of about 200 mAh was manufactured in the same manner as in Comparative Example 1, except that a liquid electrolyte obtained by dissolving 1 M LiFSi in a mixed solvent of dimethyl ether (DME) and 1,1,2,2-tetrafluoroethyl 2,2,3,3-tetrafluoropropyl ether (TTE) in a volume ratio of about 2:8.

Comparative Example 3: Manufacture of Lithium Battery

A lithium battery was manufactured in the same manner as in Example 4, except that a protective layer forming composition prepared as follows, instead of the protective layer forming composition protective layer) of Example 1, was used.

A protective layer forming composition was prepared in the same manner as in Example 1, except that a polymer blend including about 29 parts by weight of polystyrene and about 79 parts by weight of polybutylene, instead of the polystyrene-b-poly(ethylene-ran-butylene)-b-polystyrene block copolymer, was used. Then, a protective layer was prepared using the protective layer forming composition.

However, the protective layer Comparative Example 3 did not have satisfactory mechanical characteristics and ionic conductivity characteristics, because microphase separation did not occur unlike the protective layer of Example 1 including structural and hard domains.

Evaluation Example 1: Impedance Measurement

Impedance measurements were performed on the lithium batteries of Example 4 and Comparative Example 1 by using a Solartron 1260A Impedance/Gain-Phase Analyzer) at an amplitude of about ±10 milli Volts (mV) in a frequency range of about 0.1 Hertz (Hz) to about 1 mega Hertz (MHz), to measure resistance at about 25° C. by a 2-probe method.

Figure 4A:
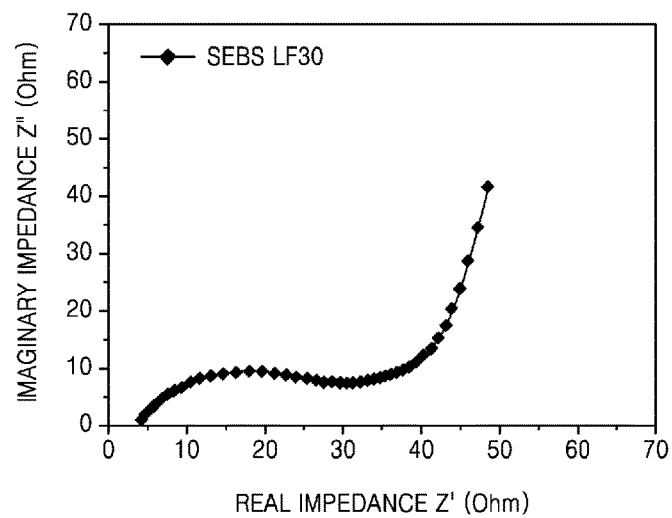
FIGS. 4A and 4B are graphs of imaginary impedance Z" (Ohms, $\Omega$)) versus real impedance Z' (Ohms, $\Omega$)) illustrating the results of impedance measurement on lithium batteries of Example 4 and Comparative Example 1.
Figure 4B:
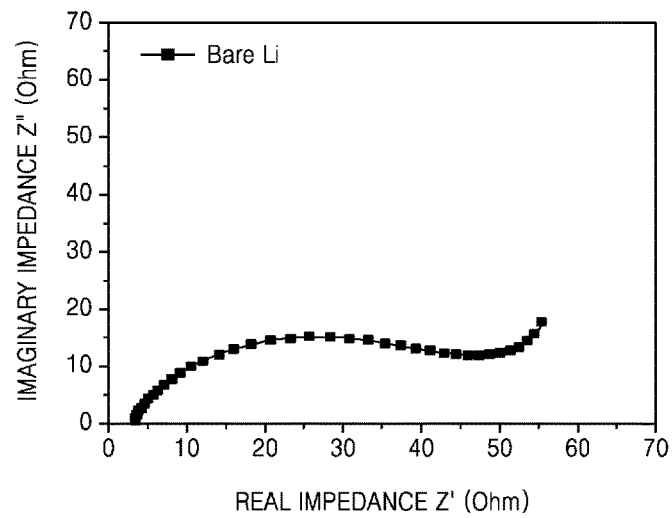

Nyquist plots obtained from the impedance measurements that were performed after 24 hours from the manufacture of the lithium batteries of Example 4 and Comparative Example 1 are shown in FIGS. 4A and 4B. In FIGS. 4A and 4B, an interfacial resistance on the electrode is determined according to the positions and sizes of semicircles. A difference between the intercepts at the left X-axis and the right X-axis of a curve represents the interfacial resistance on the electrode.

Referring to FIGS. 4A and 4B, the lithium battery of Example 1 was found to have a slightly reduced interfacial resistance compared to the lithium battery of Comparative Example 1.

Evaluation Example 2: Charge-Discharge Characteristics (Discharge Capacity)

Each of the lithium batteries of Examples 4 to 6 and Comparative Example 1 was charged at about 25° C. with a constant current of 0.1 Coulomb (C) rate to a voltage of about 4.30 Volts (V) (with respect to Li), and then with a constant voltage of 4.30 V until a cutoff current of 0.05 C rate, and was then discharged with a constant current of 0.1 C rate to a voltage of about 2.8 V (with respect to Li) (Formation process, $1^{st}$ cycle). This cycle of charging and discharging was performed 2 times more to complete the formation process.

Each of the lithium batteries after the formation process was charged at room temperature (25° C.) with a constant current of i) 0.5 C or ii) 1 C in a voltage range of about 3.0 V to 4.4 V (with respect to Li) and then discharged with a constant current of 0.2 C until a cutoff voltage of 4.4 V. The above cycle of charging and discharging was repeated 99 more times, i.e., the cycle of charging and discharging was performed 100 times in total. The capacity retention rate of each of the lithium batteries was calculated using Equation 1.

Capacity retention rate (%)=($100^{th}$ cycle discharge capacity/$1^{st}$ cycle discharge capacity)×100  Equation 1

Figure 5A:
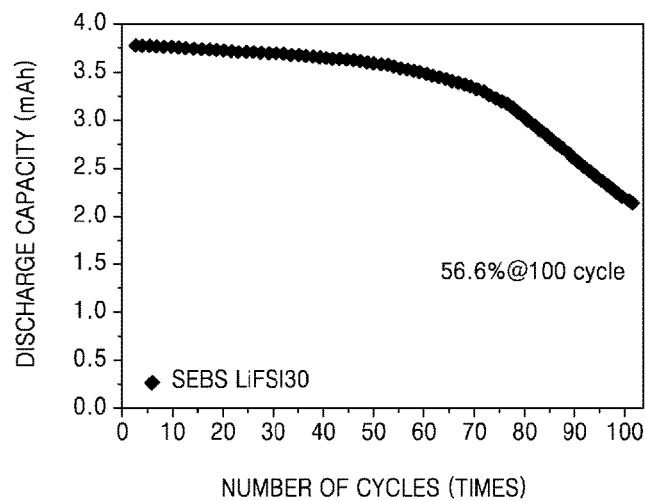
FIG. 5A is a graph of discharge capacity (milli Ampere hours) with respect to number of cycles in the lithium battery of Example 4 charged with a constant current of 0.5 Coulombs (C) or 1 Coulomb (C) after a formation process.
Figure 5B:
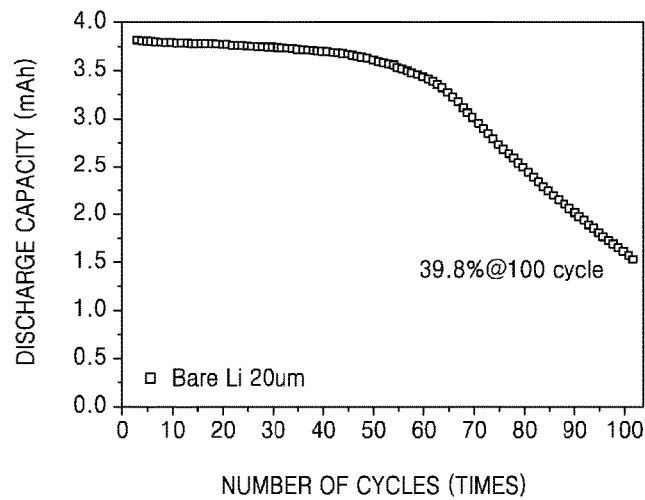
FIG. 5B is a graph of discharge capacity (milli Ampere hours) with respect to number of cycles in the lithium battery of Comparative Example 1 charged with a constant current of 0.5 C or 1 C after the formation process.
Figure 6A:
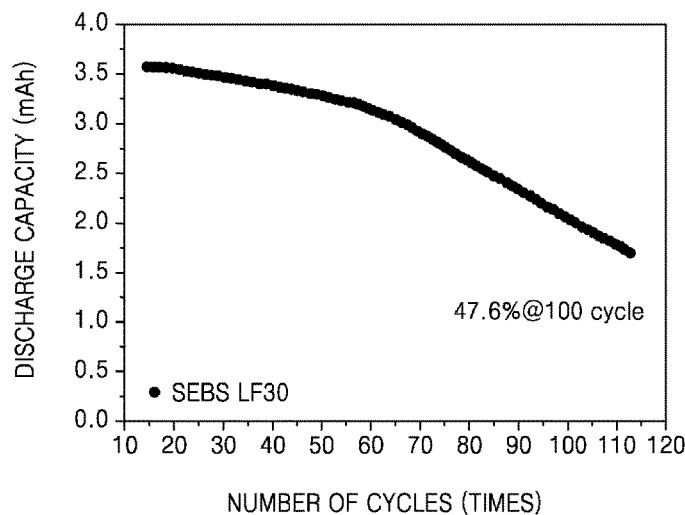
FIG. 6A is a graph of discharge capacity (milli Ampere hours) with respect to number of cycles in the lithium battery of Example 4 charged with a constant current of 1 C after a formation process.
Figure 6B:
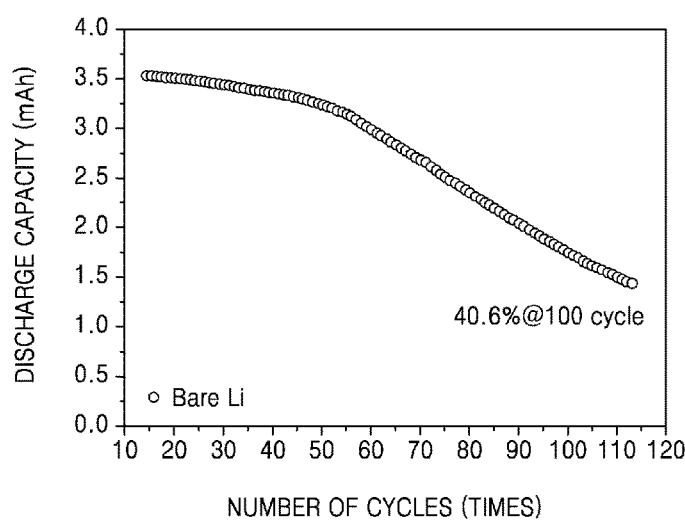
FIG. 6B is a graph of discharge capacity (milli Ampere hours) with respect to number of cycles in the lithium battery of Comparative Example 1 charged with a constant current of 1 C after the formation process.

The results of evaluating charge-discharge characteristics of the lithium batteries of Example 4 and Comparative Example 1 are shown in FIGS. 5A, 6A and 5B, 6B, respectively. In other words, changes in discharge capacity in the lithium batteries of Example 4 and Comparative Example 1 during 100 times of charge/discharge cycles are shown in FIGS. 5A and 5B, respectively. The capacity retention rates thereof are shown in Table 1. FIG. 5A is a graph of discharge capacity with respect to number of cycles in the lithium battery of Example 4 that was charged with a constant current of 0.5 C 1 C after the formation process, and FIG. 6A is a graph of discharge capacity with respect to number of cycles in the lithium battery of Example 4 that was charged with a constant current of 1 C after the formation process. FIG. 5B is a graph of discharge capacity with respect to number of cycles in the lithium battery of Comparative Example 1 that was charged with a constant current of 0.5 C or 1 C after the formation process.

TABLE 1

| Example | $100^{th}$ cycle capacity retention rate (%) (@ 0.5 C) | $100^{th}$ cycle capacity retention rate (%) (@ 1 C) |
|---|---|---|
| Example 4 | 56.6 | 46.7 |
| Comparative Example 1 | 39.8 | 40.6 |

Referring to Table 1 and FIGS. 5A, 5B, 6A, and 6B the lithium battery of Example 4 was found to have a remarkably improved capacity retention rate compared to the lithium battery of Comparative Example 1.

Also, charge-discharge characteristics of the lithium batteries of Examples 5 and 6 were evaluated. As a result of the evaluation, the lithium batteries of Examples 5 and 6 also had nearly the same capacity retention rate characteristics as the lithium battery of Example 4.

Evaluation Example 3: Charge-Discharge Characteristics (Rate Capability)

Each of the lithium batteries of Example 4 and Comparative Example 1 was charged at about 25° C. with a constant current of 0.1 C rate to a voltage of about 4.30 V (with respect to Li), and then with a constant voltage of 4.30 V until a cutoff current of 0.05 C rate, and was then discharged with a constant current of 0.1 C rate to a voltage of about 2.8 V (with respect to Li). This cycle of charging and discharging was performed 2 times more to complete the formation process.

Each of the lithium batteries after the formation process was charged with a constant current of 0.1 C to a voltage of about 4.4 V and then discharged with a constant current of 0.1 C to a voltage of 2.5 V.

From the second cycle onwards, each of the lithium batteries was charged with a constant current (CC) of 0.5 C to 4.4 V then with a constant voltage (CV) of 4.4 V until a current of 0.05 C, and was then discharged with a current of 0.1 C/0.2 C/1 C rate to 2.5 V. A cycle test was performed after charging with a CC of 1 C to 4.6 V and $100^{th}$ discharging with 1 C to 2.5 V.

The rate capability of each of the lithium batteries of Example 4 and Comparative Example 1 was calculated using Equation 2. The results are shown in Table 2.

Rate capability={Discharge capacity after cell discharging with 1 C or 2 C)/(Discharge capacity after cell discharging with 0.2 C)}×100  Equation 2

TABLE 2

| Example | Rate capability (1 C/0.2 C) (%) | Rate capability (2 C/0.2 C) (%) |
|---|---|---|
| Example 4 | 92.3 | 68.2 |
| Comparative Example 1 | 93.7 | 69.6 |

Referring to Table 2, the discharge capacities at 1 C and 2 C with respect to 0.2 C in the lithium battery of Example 4 were found to be about 92.3% and about 68.2%, respectively. The lithium battery of Example 4 was found to have nearly as high rate capability as the lithium battery of Comparative Example 1.

Charge-discharge characteristics (rate capability) of the lithium battery of Example 7 were evaluated in the same manner as on the lithium battery of Example 4.

As a result of the evaluation, the lithium battery of Example 7 was found to have nearly the same rate capability as the lithium battery of Example 4.

Evaluation Example 4: Ionic Conductivity

Ionic conductivities of the protective layers of Examples 1 and 2 and Reference Example 1 were measured as follows. The resistance of each of the protective layers was measured while scanning the temperature thereof with a bias voltage of about 10 milli Volts (mV) in a frequency range of about 1 Hz to 1 MHz, thereby measuring the ionic conductivity thereof.

As a result of the ionic conductivity measurement, the protective layer of Example 1 was found to have nearly as high ionic conductivity as the protective layer of Reference Example 1. The protective layer of Example 2 also had nearly the same ionic conductivity as the protective layer of Example 1.

Evaluation Example 5: Tensile Modulus and Elongation

Tensile moduli of the protective layers of Examples 1 to 3, and Reference Example 1 were measured using a DMA800 (available from TA Instruments). Protective layer samples for the tensile modulus measurement were prepared according to the ASTM standard D412 (Type V specimens). The tensile modulus is also known as Young's modulus.

Variations in strain with respect to stress in each of the protective layers were measured at about 25° C., a relative humidity of about 30%, and a rate of 5 millimeters per minute (mm/min). The tensile modulus of each of the protective layers was calculated from the slope of a stress-strain curve thereof, and the elongation of each of the protective layers was obtained based on the strain values.

As a result, the protective layer of Example 1 was found to have a tensile modulus of about 25.7 MPa, which is as good as the tensile modulus of the protective layer of Reference Example 1.

The protective layer of Reference Example 1 was found to have an elongation of about 140%, while the protective layer of Example 1 had an elongation about 10 times greater than that of the protective layer of Reference Example 1. These results indicate that the protective layer of Example 1 had markedly improved ductility compared to the protective layer of Reference Example 1.

The protective layer of Example 1 having a high elongation as the above result may suppress a volumetric change in the negative electrode. On the other hand, when the protective layer of Example 1 has a smaller elongation than the above result, the protective layer may be damaged by growing dendrites, and thus more likely cause a short. The protective layer of Example 1 may suppress a volumetric change in the negative electrode and consequentially dendritic growth, due to a combined effect of improved strength and ductility.

Due to an increased amount of polystyrene blocks in the protective layer of Example 1 compared to the protective layer of Example 1, the protective layer of Example 2 had a slightly increased tensile modulus and slightly reduced ductility. An increased amount of polyolefin in the protective layer of Example 3 compared to the protective layer of Example 1 led to a slightly reduced tensile modulus and increased ductility.

Evaluation Example 6: Differential Scanning Calorimetry (DSC)

The protective layer of Example 1 was analyzed by differential scanning calorimetry (DSC) using a DSC analyzer TA Q2000 (available from TA Instruments).

Figure 7:
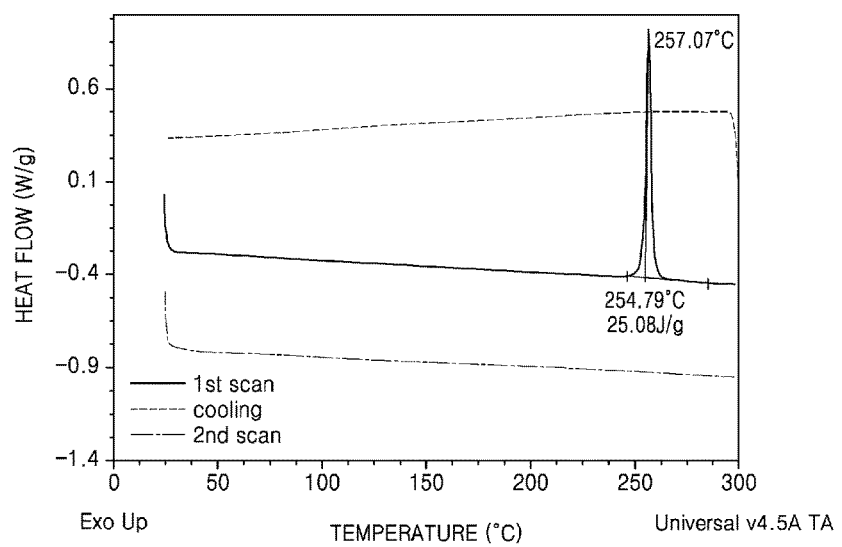
FIG. 7 is a graph of heat flow (Watts per gram) versus temperature (degrees Centigrade, ° C.) illustrating the result of differential scanning calorimetry (DSC) on a protective layer of Example 1.

The DSC results of the protective layer of Example 1 are shown in FIG. 7.

Referring to FIG. 7, the protective layer of Example 1 was found to have good thermal characteristics.

Evaluation Example 7: Electrochemical Stability Evaluation

The lithium batteries of Examples 4 and 5 and Comparative Example 1 were analyzed by cyclic voltametry at a scan rate of about 1 milli Volts per second (mV/sec) in a voltage range of about 0 V to about 6 V (with respect to Li) to evaluate the electrochemical stability of the protective layer on the lithium metal negative electrode.

As a result of the electrochemical stability evaluation, the lithium batteries of Examples 4 and 5 were found to cause neither decomposition nor any side reaction in the protective layer, except for intercalation and deintercalation of lithium at near 0 V, and to have a very low current density of about 0.02 milli Amperes per square centimeter ($mA/cm^2$) caused from side reactions such as oxidation at a voltage of up to about 5.0 V, indicating that the protective layers of the lithium batteries of Examples 4 and 5 may be electrochemically stable in a voltage range of about 0 V to about 5 V.

As described above, according to the one or more embodiments of the present disclosure, a negative electrode for a lithium battery may include a protective layer having improved mechanical characteristics and improved stability against liquid electrolyte. A lithium battery with improved cycle lifetime may be manufactured using the negative electrode.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the present disclosure as defined by the following claims.

What is claimed is:

1. A negative electrode for a lithium battery, comprising:
   a lithium metal; and
   a protective layer disposed on at least a part of the lithium metal, wherein the protective layer comprises a block copolymer comprising a structural block and a hard block covalently linked to the structural block,
   wherein the structural block is derived from at least one polymer selected from polystyrene, hydrogenated polystyrene, polyvinylpyridine, polyvinyl cyclohexane, polyethylene, polybutylene, polypropylene, poly(4-methylpentene-1), poly(polybutylene terephthalate), poly(polyethylene terephthalate), polyvinyl cyclohexane, polymaleic acid, poly(maleic anhydride), polyvinylidenefluoride, and polydivinylbenzene, or a copolymer derived from at least two of said polymers,
   wherein the structural block comprises a plurality of structural repeating units,
   wherein the hard block consists of a plurality of olefin repeating units, and
   wherein a mixed weight ratio of the structural block and the hard block is in a range of about 1:1 to about 1:4.

2. The negative electrode of claim 1, wherein the protective layer has an elongation at about 25° C. of about 500% or greater.

3. The negative electrode of claim 1, wherein the protective layer has a tensile modulus at about 25° C. of about 10 mega Pascals or greater.

4. The negative electrode of claim 1, wherein the hard block consists of at least one selected from polyethylene, polybutylene, polyisobutylene, polypropylene, a combination thereof, and a copolymer thereof.

5. The negative electrode of claim 1, wherein the block copolymer has a number average molecular weight of about 10,000 Daltons to about 200,000 Daltons.

6. The negative electrode of claim 1, wherein the block copolymer has a glass transition temperature of about 150° C. to about 300° C.

7. The negative electrode of claim 1, wherein the block copolymer has a cylindrical phase.

8. The negative electrode of claim 1, wherein the protective layer further comprises a lithium salt.

9. The negative electrode of claim 8, wherein the lithium salt is at least one selected from LiSCN, $LiN(CN)_2$, $LiClO_4$, $LiBF_4$, $LiAsF_6$, $LiPF_6$, $LiCF_3SO_3$, $LiC(CF_3SO_2)_3$, $LiN(SO_2C_2F_5)_2$, $LiN(SO_2CF_3)_2$, $LiN(SO_2F)_2$, $LiSbF_6$, $LiPF_3(CF_2CF_3)_3$, $LiPF_3(CF_3)_3$, and $LiB(C_2O_4)_2$.

10. The negative electrode of claim 8, wherein the amount of the lithium salt is in a range of about 10 parts to about 70 parts by weight based on 100 parts by weight of the block copolymer.

11. The negative electrode of claim 1, wherein the protective layer further comprises at least one of an inorganic particle, an ionic liquid, a polymer ionic liquid, and an oligomer.

12. The negative electrode of claim 11, wherein the inorganic particle is at least one selected from $SiO_2$, $TiO_2$, ZnO, $Al_2O_3$, $BaTiO_3$, graphite oxide, graphene oxide, cage-structured silsesquioxane, $Li_2CO_3$, $Li_3PO_4$, $Li_3N$, $Li_3S_4$, $Li_2O$, montmorillonite, and a metal-organic framework.

13. The negative electrode of claim 11, wherein the ionic liquid is at least one selected from compounds each comprising:
   i) a cation of at least one selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, and a triazolium cation, and
   ii) an anion of at least one selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $BF_4^-$, $SO_4^-$, $PF_6^-$, $CF_3SO_3^-$, $(FSO_2)_2N^-(C_2F_5SO_2)_2N^-$, $(C_2F_5SO_2)(CF_3SO_2)N^-$, and $(CF_3SO_2)_2N^-$.

14. The negative electrode of claim 11, wherein the oligomer is at least one selected from polyethylene glycol dimethyl ether and polyethylene glycol diethyl ether.

15. The negative electrode of claim 1, wherein the protective layer has a thickness of about 1 micrometer to about 20 micrometers.

16. The negative electrode of claim 1, wherein the protective layer has an ionic conductivity at about 25° C. of about $1 \times 10^{-4}$ Siemens per centimeter or greater.

17. The negative electrode of claim 1, wherein an interfacial resistance $R_i$ at about 25° C. of the protective layer with respect to the lithium metal that is obtained from a Nyquist plot through an impedance measurement is about 10% or less than the resistance of bare lithium metal.

18. The negative electrode of claim 1, wherein the structural block is further derived from at least one polymer selected from polymethacrylate, poly(methyl methacrylate), polyimide, polyamide, poly(isobutyl methacrylate), polydimethylsiloxane, polyacrylonitrile, polyamide, poly(methacrylic acid), poly(tert-butyl vinyl ether), poly(cyclohexyl methacrylate), poly(cyclohexyl vinyl ether), poly(tert-butyl vinyl ether), or a copolymer derived from at least two of said polymers.

19. A negative electrode for a lithium battery, comprising:
   a lithium metal; and
   a protective layer disposed on at least a part of the lithium metal, wherein the protective layer comprises a block copolymer,
   wherein the block copolymer of the protective layer is
   a block copolymer comprising a polystyrene first block and a polyethylene second block;
   a block copolymer comprising a polystyrene first block and a polybutylene second block;
   a block copolymer comprising a polymethylmethacrylate block and a polyethylene second block;
   a block copolymer comprising a polymethylmethacrylate block and a polybutylene second block;
   a block copolymer comprising a polymethylmethacrylate first block and a polyethylene/polybutylene second block;
   a block copolymer comprising a polystyrene first block, a polyethylene second block, and a polystyrene third block;
   a block copolymer comprising a polystyrene first block, a polybutylene second block, and a polystyrene third block;
   a block copolymer comprising a polymethylmethacrylate first block, a polyethylene second block, and a polystyrene third block;
   a block copolymer comprising a polymethylmethacrylate first block, a polybutylene second block, and a polystyrene third block;
   a block copolymer comprising a polymethylmethacrylate first block, a polyethylene/polybutylene second block, and a polystyrene third block;
   a block copolymer comprising a polystyrene first block and a polyethylene/polybutylene second block copolymer; or a block copolymer comprising a polystyrene first block, a polyethylene/polybutylene second block, and a polystyrene third block.

20. A lithium battery comprising:

a positive electrode, the negative electrode, and an electrolyte disposed between the positive electrode and the negative electrode, wherein the electrolyte comprises a separator and a liquid electrolyte, and the lithium battery has a stack structure of the negative electrode, the separator, the liquid electrolyte, and the positive electrode that are stacked upon one another in the stated order, wherein the negative electrode comprises:

a lithium metal; and a protective layer disposed on at least a part of the lithium metal, wherein the protective layer comprises a block copolymer comprising a structural block and a hard block covalently linked to the structural block, wherein the structural block is derived from at least one polymer selected from polystyrene, hydrogenated polystyrene, polyvinylpyridine, polyvinyl cyclohexane, polyethylene, polybutylene, polypropylene, poly(4-methylpentene-1), poly(polybutylene terephthalate), poly(polyethylene terephthalate), polyvinyl cyclohexane, polymaleic acid, poly(maleic anhydride), polyvinylidenefluoride, and polydivinylbenzene, or a copolymer derived from at least two of said polymers, wherein the structural block comprises a plurality of structural repeating units, wherein the hard block consists of a plurality of olefin repeating units, and wherein a mixed weight ratio of the structural block and the hard block is in a range of about 1:1 to about 1:4.

21. The lithium battery of claim 20, wherein the electrolyte comprises at least one selected from a liquid electrolyte, a solid electrolyte, a gel electrolyte, and a polymer ionic liquid.

22. The lithium battery of claim 20, wherein the electrolyte comprises at least one selected from ethylene carbonate, propylene carbonate, dimethyl carbonate, diethyl carbonate, ethylmethyl carbonate, fluoroethylene carbonate, gamma-butyrolactone, dimethoxy ethane, diethoxy ethane, dimethylene glycol dimethyl ether, triethylene glycol dimethyl ether, tetraethylene glycol dimethyl ether, polyethylene glycol dimethyl ether, succinonitrile, sulfolane, dimethyl sulfone, ethyl methyl sulfone, diethyl sulfone, adiponitrile, and 1,1,2,2-tetrafluoroethyl 2,2,3,3-tetrafluoropropyl ether.

* * * * *